US012724356B2

United States Patent
(12) United States Patent
Arimura et al.

(10) Patent No.: US 12,724,356 B2
(45) Date of Patent: Sep. 1, 2026

(54) TONER

(71) Applicant: CANON KABUSHIKI KAISHA, Tokyo (JP)

(72) Inventors: Satoshi Arimura, Shizuoka (JP); Kosuke Fukudome, Tokyo (JP); Kenta Kamikura, Kanagawa (JP); Shohei Tsuda, Shizuoka (JP); Yuta Komiya, Kanagawa (JP); Toru Ishii, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 477 days.

(21) Appl. No.: 18/354,735

(22) Filed: Jul. 19, 2023

(65) Prior Publication Data

US 2024/0036489 A1 Feb. 1, 2024

(30) Foreign Application Priority Data

Aug. 1, 2022 (JP) ................................. 2022-122544

(51) Int. Cl.
*G03G 9/093* (2006.01)
*G03G 9/097* (2006.01)

(52) U.S. Cl.
CPC ..... *G03G 9/09385* (2013.01); *G03G 9/09328* (2013.01); *G03G 9/09371* (2013.01); *G03G 9/09775* (2013.01)

(58) Field of Classification Search
CPC ........... G03G 9/09385; G03G 9/09328; G03G 9/09371; G03G 9/09775
See application file for complete search history.

(56) References Cited

U.S. PATENT DOCUMENTS

| | | | |
|---|---|---|---|
| 8,828,639 | B2 | 9/2014 | Kamikura |
| 9,034,549 | B2 | 5/2015 | Shiotari |
| 9,040,216 | B2 | 5/2015 | Fukudome |
| 9,116,448 | B2 | 8/2015 | Terauchi |
| 9,134,637 | B2 | 9/2015 | Hotta |
| 9,141,012 | B2 | 9/2015 | Moribe |
| 9,256,148 | B2 | 2/2016 | Fujikawa |
| 9,261,806 | B2 | 2/2016 | Moribe |
| 9,285,697 | B2 | 3/2016 | Fukudome |
| 9,470,993 | B2 | 10/2016 | Nishikawa |
| 9,575,425 | B2 | 2/2017 | Naka |
| 9,588,450 | B2 | 3/2017 | Tsuda |
| 9,594,323 | B2 | 3/2017 | Fujikawa |
| 9,606,462 | B2 | 3/2017 | Nomura |
| 9,658,546 | B2 | 5/2017 | Tanaka |
| 9,715,188 | B2 | 7/2017 | Terauchi |
| 9,772,570 | B2 | 9/2017 | Tsuda |
| 9,778,583 | B2 | 10/2017 | Terauchi |
| 9,804,519 | B2 | 10/2017 | Suzumura |
| 9,857,707 | B2 | 1/2018 | Tsuda |
| 9,880,478 | B2 | 1/2018 | Shimano |
| 9,904,195 | B2 | 2/2018 | Matsui |
| 9,927,728 | B2 | 3/2018 | Arimura |
| 9,946,179 | B2 | 4/2018 | Arimura |
| 9,952,523 | B2 | 4/2018 | Shimano |
| 9,971,263 | B2 | 5/2018 | Fukudome |
| 10,012,919 | B2 | 7/2018 | Matsui |
| 10,012,923 | B2 | 7/2018 | Sano |
| 10,101,683 | B2 | 10/2018 | Nishikawa |
| 10,156,800 | B2 | 12/2018 | Tsuda |
| 10,197,934 | B2 | 2/2019 | Matsui |
| 10,228,627 | B2 | 3/2019 | Nagashima |
| 10,289,016 | B2 | 5/2019 | Fukudome |
| 10,295,921 | B2 | 5/2019 | Ohmori |
| 10,303,074 | B2 | 5/2019 | Yamawaki |
| 10,310,396 | B2 | 6/2019 | Kamikura |
| 10,338,487 | B2 | 7/2019 | Kamikura |
| 10,345,726 | B2 | 7/2019 | Nakamura |
| 10,353,308 | B2 | 7/2019 | Hatakeyama |
| 10,401,750 | B2 | 9/2019 | Nakamura |
| 10,429,757 | B2 | 10/2019 | Yoshida |
| 10,503,090 | B2 | 12/2019 | Tominaga |
| 10,539,893 | B2 | 1/2020 | Tanaka |
| 10,539,899 | B2 | 1/2020 | Nakamura |
| 10,545,420 | B2 | 1/2020 | Kinumatsu |
| 10,545,422 | B2 | 1/2020 | Yamawaki |
| 10,551,758 | B2 | 2/2020 | Tanaka |
| 10,578,990 | B2 | 3/2020 | Tsuda |
| 10,635,010 | B2 | 4/2020 | Kamikura |

(Continued)

FOREIGN PATENT DOCUMENTS

| | | | |
|---|---|---|---|
| JP | 9-288380 | A | 11/1997 |
| JP | 2001-215749 | A | 8/2001 |
| JP | 2004-326049 | A | 11/2004 |
| JP | 2012-47914 | A | 3/2012 |
| JP | 2015-11077 | A | 1/2015 |
| JP | 2015-506493 | A | 3/2015 |
| JP | 2021-6839 | A | 1/2021 |

OTHER PUBLICATIONS

U.S. Appl. No. 18/360,142, filed Jul. 27, 2023, Yuta Komiya.
U.S. Appl. No. 18/360,391, filed Jul. 27, 2023, Kenta Kamikura.

*Primary Examiner* — Mark F. Huff
*Assistant Examiner* — Boone Alexander Evans
(74) *Attorney, Agent, or Firm* — VENABLE LLP

(57) ABSTRACT

A toner comprising a toner particle, the toner particle comprising a binder resin and a boric acid, wherein, where the toner particle is subjected to ATR-IR analysis by using germanium as an ATR crystal in an ATR method, a peak corresponding to the boric acid is detected, the toner comprises a fatty acid metal salt on a surface of the toner particle, and a presence ratio of an boron element on the surface of the toner particle is 0.01 atomic % or less as measured by X-ray photoelectron spectroscopy.

11 Claims, No Drawings

(56) References Cited

U.S. PATENT DOCUMENTS

| | | | |
|---|---|---|---|
| 10,698,327 | B2 | 6/2020 | Nagashima |
| 10,732,530 | B2 | 8/2020 | Matsui |
| 10,782,623 | B2 | 9/2020 | Yoshiba |
| 10,845,722 | B2 | 11/2020 | Nishikawa |
| 10,859,933 | B2 | 12/2020 | Kinumatsu |
| 10,877,387 | B2 | 12/2020 | Fukudome |
| 10,877,388 | B2 | 12/2020 | Aoki |
| 10,877,389 | B2 | 12/2020 | Kamikura |
| 10,895,815 | B2 | 1/2021 | Kamikura |
| 10,976,678 | B2 | 4/2021 | Yamawaki |
| 11,003,103 | B2 | 5/2021 | Kinumatsu |
| 11,092,905 | B2 | 8/2021 | Fukudome |
| 11,099,493 | B2 | 8/2021 | Komiya |
| 11,112,708 | B2 | 9/2021 | Uratani |
| 11,112,712 | B2 | 9/2021 | Matsunaga |
| 11,169,458 | B2 | 11/2021 | Toyoizumi |
| 11,175,600 | B2 | 11/2021 | Uchiyama |
| 11,181,839 | B2 | 11/2021 | Yamashita |
| 11,181,840 | B2 | 11/2021 | Nagata |
| 11,181,844 | B2 | 11/2021 | Nagaoka |
| 11,181,846 | B2 | 11/2021 | Kinumatsu |
| 11,249,408 | B2 | 2/2022 | Tsuda |
| 11,256,187 | B2 | 2/2022 | Ogaki |
| 11,287,758 | B2 | 3/2022 | Matsui |
| 11,314,178 | B2 | 4/2022 | Kenmoku |
| 11,333,989 | B2 | 5/2022 | Unno |
| 11,347,157 | B2 | 5/2022 | Kamikura |
| 11,531,282 | B2 | 12/2022 | Kamikura |
| 2003/0022086 | A1* | 1/2003 | Iga .................... G03G 9/09708 430/108.1 |
| 2012/0052430 | A1* | 3/2012 | Yamasaki .......... G03G 9/09321 430/108.1 |
| 2015/0004540 | A1 | 1/2015 | Ozawa |
| 2020/0409297 | A1* | 12/2020 | Ikada ................ G03G 15/5037 |
| 2022/0146952 | A1 | 5/2022 | Komiya |
| 2022/0146955 | A1 | 5/2022 | Nozaki |
| 2022/0206402 | A1 | 6/2022 | Uratani |
| 2022/0214629 | A1 | 7/2022 | Kenmoku |
| 2022/0214630 | A1 | 7/2022 | Kamikura |
| 2022/0291601 | A1 | 9/2022 | Katsura |
| 2023/0042289 | A1 | 2/2023 | Tanaka |
| 2023/0047510 | A1 | 2/2023 | Tsuda |
| 2023/0080900 | A1 | 3/2023 | Kamikura |
| 2023/0117448 | A1 | 4/2023 | Fukudome |
| 2023/0122974 | A1 | 4/2023 | Kagawa |
| 2023/0161277 | A1 | 5/2023 | Komiya |
| 2023/0273538 | A1 | 8/2023 | Fukudome |
| 2023/0314974 | A1 | 10/2023 | Tsuda |

* cited by examiner

TONER

BACKGROUND OF THE INVENTION

Field of the Invention

The present invention relates to a toner suitable for electrophotography, electrostatic recording, and toner jet recording method.

Description of the Related Art

In recent years, a demand has been created for further reduction in power consumption in electrophotographic image forming apparatuses such as multifunction machines and printers. In electrophotography, first, an electrostatic latent image is formed on an electrophotographic photosensitive member (image carrier) through charging and exposure steps. Next, the electrostatic latent image is developed with a developer including a toner, and a visualized image (fixed image) is obtained through a transfer step and a fixing step.

Among the above steps, the fixing step requires a relatively large amount of energy, and from the viewpoint of reducing power consumption, reduction of the amount of heat applied to the fixing device has been studied. As for toner, there is an increasing need for a so-called low-temperature fixing toner that can be fixed with a smaller amount of heat.

One of the techniques for enabling fixing at a low temperature is to lower the glass transition temperature (Tg) of the binder resin in the toner. However, when the Tg is lowered, a low-molecular-weight resin and a release agent in the toner tend to migrate to the toner surface, leading to a decrease in the heat-resistant storage stability of the toner, so that it is difficult to achieve both low-temperature fixability and heat-resistant storage stability of the toner with such technique.

As a means of achieving both low-temperature fixability and heat-resistant storage stability, a technique has been proposed that generally uses a crystalline resin with a sharp melt property in which large drop in viscosity occurs when the melting point is exceeded.

However, the problem related to surface migration of low-molecular-weight resins and release agents in toner still remains. Due to the occurrence of this problem, toner flowability is lowered, charging characteristics are lowered particularly in a high-temperature and high-humidity environment, and image defects such as fogging and a decrease in image density due to long-term use are caused.

Therefore, Japanese Patent Application Publication No. 2015-11077 discloses a toner in which the surface of a toner core particle is coated with a shell made of a resin including a unit derived from a thermosetting resin monomer and a unit derived from a thermoplastic resin.

SUMMARY OF THE INVENTION

However, in the case of a structure in which the surface of a toner core particle is covered with a shell, although the migration of the low-molecular-weight resin and release agent in the toner to the toner particle surface can be suppressed, the low-temperature fixability is lowered by inhibition of fixing caused by the formation of the shell. Thus, there is a problem in achieving both heat-resistant storage stability and low-temperature fixability.

The present inventors investigated the incorporation of boric acid into a toner particle in order to achieve both heat-resistant storage stability and low-temperature fixability. It has been found that where boric acid is comprised, the boric acid and the functional groups of the binder resin in the toner particle form a crosslinked structure, and both heat-resistant storage stability and low-temperature fixability can be achieved. However, it was found that the crosslinked structure is likely to collapse in an environment where temperature and pressure change, and as a result, free boric acid exudes onto the toner particles surface, causing a problem of reduced charging characteristics in a high-temperature and high-humidity environment.

The present disclosure provides a toner in which deterioration of charging characteristics can be suppressed and high-quality electrophotographic images having excellent low-temperature fixability and heat-resistant storage stability can be stably formed even in a high-temperature and high-humidity environment and with a long service life.

The present disclosure provides a toner comprising a toner particle, the toner particle comprising a binder resin and a boric acid, wherein

- where the toner particle is subjected to ATR-IR analysis by using germanium as an ATR crystal in an ATR method, a peak corresponding to the boric acid is detected,
- the toner comprises a fatty acid metal salt on a surface of the toner particle, and
- a presence ratio of a boron element on a surface of the toner particle is 0.01 atomic % or less as measured by X-ray photoelectron spectroscopy.

According to the present disclosure, it is possible to provide a toner in which deterioration of charging characteristics can be suppressed and high-quality electrophotographic images having excellent low-temperature fixability and heat-resistant storage stability can be stably formed even in a high-temperature and high-humidity environment and with a long service life.

Further features of the present invention will become apparent from the following description of exemplary embodiments.

DESCRIPTION OF THE EMBODIMENTS

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

In the present disclosure, the following toner is used.

The toner comprising a toner particle, the toner particle comprising a binder resin and a boric acid, and where the toner particle is subjected to ATR-IR analysis by using germanium as an ATR crystal in an ATR method, a peak corresponding to the boric acid is detected. And the toner comprises a fatty acid metal salt on a surface of the toner particle. Moreover, a presence ratio of a boron element on the surface of the toner particle is 0.01 atomic % or less as measured by X-ray photoelectron spectroscopy. By using such toner, it is possible to provide a toner in which deterioration of charging characteristics can be suppressed and high-quality electrophotographic images having excellent low-temperature fixability and heat-resistant storage stability can be stably formed even in a high-temperature and high-humidity environment and with a long service life. The reason for this is explained below.

In the ATR method, where an absorption peak appears at 1380 $cm^{-1}$ when germanium (Ge) is used as the ATR crystal and the absorption spectrum is measured in the range from 4000 $cm^{-1}$ to 650 $cm^{-1}$ under the condition of an incident angle of 45°, it means that boric acid is present at a depth of about 0.3 μm. That is, the detection of a peak corresponding to boric acid from the toner particle by ATR-IR analysis using germanium is considered to indicate that boric acid is present in the vicinity of the toner particle surface.

In addition, by performing measurement by X-ray photoelectron spectroscopy (ESCA), it is possible to perform qualitative and quantitative analysis of the elements present in the surface area of several nm of the toner particle. The presence ratio of a boron element on the surface of the toner particle measured by X-ray photoelectron spectroscopy being 0.01 atomic % or less means that boron element is scarcely present in the surface area of several nm of the toner particle.

That is, the toner of the present disclosure comprises boric acid in the region near the surface inside the toner particles (depth of about 0.3 μm), but it is considered that boron element is scarcely present on the surface (several nanometers) of the toner particle.

The toner comprises a toner particle, and the toner particle comprising a binder resin and boric acid.

Boric acid is represented by $B(OH)_3$ and has hydroxy groups. The hydroxy groups of boric acid can form a crosslinked structure through hydrogen bonds with the functional groups of the binder resin. That is, a crosslinked structure can be formed by hydrogen bonding between the boric acid and the binder resin inside the toner particle. A hydrogen bond is not a strong bond like a covalent bond and thus is quickly broken when temperature or pressure (stress etc.) above a certain level is applied. Therefore, the presence of a crosslinked structure due to hydrogen bonding inside the toner particle makes it possible to achieve both low-temperature fixability and heat-resistant storage stability.

As mentioned above, the crosslinked structure due to hydrogen bonding is likely to collapse in an environment where the temperature or pressure (stress etc.) changes above a certain level. In such an environment, when the crosslinked structure collapses and hydrogen bonds are broken, excess boric acid is present in the toner particle. In this case, especially in a high-temperature and high-humidity environment, excess boric acid migrates to the toner particles surface and easily exudes onto the toner surface. As a result, the hydrophilicity of the toner surface is increased, so that charging characteristics of the toner is decreased and image defects such as fogging and a decrease in image density due to long-term use are likely to occur.

In response to the above problem, it was found that the charging characteristics of the toner can be improved by allowing a fatty acid metal salt to be present on the toner particle surface. That is, the toner comprises a fatty acid metal salt on the surface of the toner particle. For example, the toner comprises a fatty acid metal salt as an external additive. The reason why the presence of the fatty acid metal salt on the toner particle surface improves the charging characteristics of the toner is presumed as follows.

The presence of the fatty acid metal salt on the toner particle surface allows the surplus boric acid in the toner particle to interact with the metal segment of the fatty acid metal salt present on the toner particle surface. Due to this interaction, the boric acid comprised in the toner particle can be prevented from exuding onto the outermost layer of the toner, and the hydrophilicity of the toner surface can be kept low. In addition, a long-chain fatty acid derived from the fatty acid metal salt is present in the vicinity of boric acid attracted to the metal segment of the fatty acid metal salt due to the interaction. As a result, the orientation of water molecules on the toner surface is suppressed, and the decrease in the charge quantity of the toner can be suppressed. As a result, fogging and reduction in image density can be suppressed. This is an unexpected effect due to the interaction between the fatty acid metal salt, which serves as a cleaning aid, and the surplus boric acid present in the toner particles.

The toner particle comprises boric acid inside. That is, when the toner particle is subjected to ATR-IR analysis using germanium as the ATR crystal in the ATR method, a peak corresponding to boric acid is detected.

Boric acid can be comprised in the toner particle as an internal additive. When it is comprised in the toner particle as a raw material, it may be used in the form of an organic boric acid, a borate, a borate ester, or the like. When the toner is produced in an aqueous medium, boric acid is preferably added as a borate from the viewpoint of reactivity and production stability. Specific examples include sodium tetraborate, ammonium borate, borax, and the like.

Among the borates exemplified above, borax is particularly preferably used. Borax is represented by the decahydrate of sodium tetraborate ($Na_2B_4O_7$), which converts to boric acid in an acidic aqueous solution. Therefore, for use in an acidic environment in an aqueous medium, borax is preferably used.

The binder resin preferably comprises a resin capable of forming hydrogen bonds with boric acid. Resins capable of forming hydrogen bonds with boric acid include resins having at least one selected from the group consisting of ester bonds, hydroxy groups, carboxy groups, amino groups, and the like. A resin having at least one selected from the group consisting of a hydroxy group and a carboxy group is more preferred. Specific examples include known polyester resins and styrene-acrylic resins, which are copolymers of styrene and (meth)acrylic acid alkyl esters, which are commonly used in toners. Among these, the binder resin preferably comprises a polyester resin.

The mass-based content of boron element in the toner is preferably 80 to 2000 ppm. By controlling the content of the boron element within this range, it is possible to appropriately form a crosslinked structure due to hydrogen bonding inside the toner particle, and both low-temperature fixability and charging performance of the tone are easily achieved. Also, the boron element is preferably derived from boric acid.

The mass-based content of boron element in the toner is more preferably 100 ppm or more, still more preferably 300 ppm or more, and even more preferably 500 ppm or more. Also, it is more preferably 1500 ppm or less, still more preferably 1000 ppm or less, and even more preferably 800 ppm or less. For example, the ranges of 100 to 1500 ppm, 300 to 1000 ppm and 500 to 800 ppm are preferred.

As a means for controlling the mass-based content of boron element in the toner within the above range, for example, the addition amount of boric acid, organic boric acid, borate, borate ester, or the like is adjusted during the production of toner particles. The addition amount is preferably 0.05 to 1.50 parts by mass in terms of boric acid per 100 parts by mass of the toner.

In cross-sectional observation of the toner with a transmission electron microscope, when an area ratio occupied by a release agent in a surface layer region from the surface of the toner particle to a depth of 1.0 μm is denoted by As, the As is preferably 5.0% or less.

The area ratio As occupied by the release agent in the surface layer region of the toner particle being 5.0% or less means that the amount of the release agent present on the surface of the toner particle is small. Since the amount of the release agent present on the surface of the toner particle is small, it is possible to suppress the decrease in flowability of the toner particles, and it is possible to further suppress the decrease in the charge quantity in a high-temperature and high-humidity environment. As a result, image fogging can be suppressed.

The area ratio As occupied by the release agent in the surface layer region of the toner particle is more preferably 3.0% or less, even more preferably 1.0% or less. Although the lower limit is not particularly limited, the area ratio is preferably 0.01% or more, more preferably 0.05% or more. For example, the area ratio preferably ranges 0.01 to 3.0% and 0.05 to 1.0%.

In the case when a shell is formed on the toner core particle surface, the area ratio As occupied by the release agent in the surface layer region of the toner particle can be controlled by the number of parts of the resin particles added in the shell formation step. Specifically, the area ratio can be reduced by setting the number of parts to 1 to 4 parts by mass with respect to 100 parts by mass of the toner. Further, in the case when no shell is formed on the toner core particle surface, the area ratio As occupied by the release agent can be also controlled by the amount of the release agent added and the SP value of each raw material. Specifically, the area ratio can be reduced by reducing the amount of the release agent added or by controlling the SP value of each raw material.

A fatty acid metal salt is present on the surface of the toner particle. The toner particle surface can be provided with a fatty acid metal salt by external addition to the toner particle. As described above, the presence of the fatty acid metal salt on the surface of the toner particle can keep the hydrophilicity of the toner surface low, suppress the orientation of water molecules, and suppress the decrease in the charge quantity.

The presence ratio of boron element on the surface of the toner particle, which is measured by X-ray photoelectron spectroscopy, is 0.01 atomic % or less. That is, the toner of the present disclosure is characterized by substantially no boron element presents on the toner particle surface.

Further, when the presence ratio of boron element on the surface of the toner particle is 0.01 atomic % or less, the boric acid in the toner particle and the metal portion of the fatty acid metal salt proceeds interact appropriately, and the amount of boric acid exuding to the surface of the toner particle is small. Therefore, when the presence ratio of boron element on the surface of the toner particle is 0.01 atomic % or less, the hydrophilicity of the toner surface can be kept low, and the charging characteristics of the toner can be improved.

The presence ratio of boron element on the surface of the toner particle measured by X-ray photoelectron spectroscopy is 0.01 atomic % or less, preferably 0.005 atomic % or less, and more preferably 0 atomic %.

In the case when a shell is formed on the surface of the toner core particle, the presence ratio of boron element on the surface of the toner particle can be controlled by the number of parts of the resin particles added in the shell formation step. Specifically, the presence ratio can be reduced by setting the number of parts to 0.5 to 4 parts by mass with respect to 100 parts by mass of the toner. Further, in the case when no shell is formed on the toner core particle surface, the presence ratio of boron element can also be controlled by the boron content and the conditions of the toner particle washing step.

The content of the fatty acid metal salt in the toner is preferably from 0.05 to 0.50 parts by mass with respect to 100 parts by mass of the toner particles. Moreover, the content of the fatty acid metal salt in the toner is more preferably from 0.10 to 0.40 parts by mass with respect to 100 parts by mass of the toner particles. By controlling the content within this range, the hydrophilicity of the toner surface can be kept low while the decrease in flowability can be suppressed, and the decrease in the charge quantity of the toner can be suppressed.

As the fatty acid metal salt used in the toner, conventionally known fatty acid metal salts can be used without any particular limitation. Specific examples are listed hereinbelow.

Fatty acid metal salts composed of saturated fatty acids and monovalent metals represented by lithium montanate, sodium montanate, lithium stearate, and the like; fatty acid metal salts composed of saturated fatty acids and divalent metals, such as zinc laurate, calcium laurate, zinc stearate, calcium stearate, barium stearate, zinc behenate, calcium behenate, calcium montanite, and the like; fatty acid metal salts composed of saturated fatty acids and trivalent metals, such as aluminum stearate and the like; fatty acid metal salts composed of fatty acids modified with a hydroxy group and divalent metals, such as calcium 12-hydroxystearate, zinc 12-hydroxystearate, and the like; fatty acid metal salts composed of fatty acids modified with a hydroxy group and trivalent metals, such as aluminum 12-hydroxystearate and the like; fatty acid metal salts composed of unsaturated fatty acids and monovalent metals, such as lithium oleate and the like; fatty acid metal salts composed of unsaturated fatty acids and divalent metals, such as zinc oleate and the like; fatty acid metal salts composed of unsaturated fatty acids and trivalent metals such as aluminum oleate and the like; and the like.

When the toner is subjected to dispersion treatment in a dispersion liquid obtained by adding sucrose and a surfactant to ion-exchanged water, the amount of fatty acid metal salt migrated from the toner to the dispersion liquid is preferably 0.04 to 0.20 parts by mass based on 100 parts by mass of the toner particles. By controlling the amount within this range, it is possible to suppress the decrease in the charge quantity due to the separation of the fatty acid metal salt from the toner particle and, at the same time, to enable the fatty acid metal salt to play a role as a cleaning aid. As a result, it is possible to obtain a toner excellent in durable developing performance and cleaning performance.

The amount of the fatty acid metal salt migrated from the toner to the dispersion liquid is more preferably 0.05 parts or more, still more preferably 0.08 parts or more. Moreover, this amount is more preferably 0.15 parts or less, still more preferably 0.13 parts or less. For example, this amount preferably ranges 0.05 to 0.15 parts and 0.08 to 0.13 parts. The amount of the fatty acid metal salt migrated from the toner to the dispersion liquid can be controlled by the external addition and mixing time and the amount of the fatty acid metal salt added when externally adding the fatty acid metal salt to the toner particle. Specifically, this amount can be reduced by lengthening the external addition and mixing time and by reducing the number of parts of the fatty acid metal salt added. Moreover, this amount can be increased by shortening the external addition and mixing time and by increasing the amount of the fatty acid metal salt added.

When a content of a metal element in the toner is denoted by A (mol/μg), a valence of a metal of the fatty acid metal salt is denoted by B, and a content of a boron in the toner is denoted by C (mol/μg), the A, the B, and the C satisfy a following formula (1). Also, the metal element with the content represented by A (mol/μg) is preferably derived from the fatty acid metal salt.

$$C/10 < A \times B \quad (1)$$

When the above A, B and C satisfy formula (1), boric acid in the toner particle and the fatty acid metal salt on the surface of the toner particle can sufficiently interact with each other. As a result, surplus boric acid in the toner particle is attracted to the metal segment of the fatty acid metal salt, thereby sufficiently preventing boric acid from being exposed to the toner surface. As a result, it is possible to obtain a toner excellent in durable developing performance.

The fatty acid metal salt to be present on the surface of the toner particle is not particularly limited, but is preferably a salt of a higher fatty acid having 16 to 20 carbon atoms and a polyvalent metal having a valence of 2 or more. The fatty acid is preferably a linear saturated fatty acid, such as stearic acid, palmitic acid, arachidic acid, and the like. Zinc, aluminum, barium, and the like are preferable as the metal.

The fatty acid metal salt is preferably at least one compound selected from the group consisting of zinc stearate, aluminum stearate, and barium stearate. In particular, zinc stearate is preferably used. Zinc stearate is particularly superior in hydrophobicity due to the steric structure thereof as compared to other fatty acid metal salts. Therefore, when zinc stearate is used as the fatty acid metal salt, it is possible to further suppress the decrease in charge quantity in a high-temperature and high-humidity environment.

The 50% particle diameter based on volume distribution of the fatty acid metal salt is preferably 0.2 to 2.0 μm, more preferably 0.5 to 1.5 μm. When the particle diameter is within the above range, a toner having excellent cleaning performance can be obtained.

The toner particle preferably has, for example, a toner core particle comprising a resin capable of forming hydrogen bonds with boric acid and boric acid, and a shell on the toner core particle surface. The shell does not necessarily have to cover the entire toner core particle, and the toner core particle may be partially exposed as long as the presence ratio of boron element determined by X-ray photoelectron spectroscopic analysis is satisfied.

The shell on the toner core particle surface preferably comprises a resin capable of forming hydrogen bonds with boric acid, and more preferably comprises a polyester resin. With such a configuration, a crosslinked structure is formed by hydrogen bonding between boric acid comprised inside the toner core particle and the resin that is capable of forming hydrogen bonds with boric acid and that forms the shell on the toner core particle surface. As a result, both low-temperature fixability and heat-resistant storage stability can be achieved at a high level.

The components that constituting the toner particle and a method of manufacturing the toner will be described in more detail.

Binder Resin

The toner particle comprises a binder resin. The content of the binder resin is preferably 50% by mass or more with respect to the total amount of the resin components in the toner particle.

As described above, the binder resin comprises a resin capable of forming hydrogen bonds with boric acid. Examples of resins capable of forming hydrogen bonds with boric acid include resins having ester bonds, hydroxy groups, carboxy groups, amino groups, and the like. Specific examples include known polyester resins, styrene acrylic resins which are copolymers of styrene and (meth)acrylic acid alkyl esters (the number of carbon atoms of the alkyl group is 1 to 8 (preferably 2 to 6)), and the like that are commonly used in toners. It is preferable that a polyester resin be comprised as the resin capable of forming hydrogen bonds with boric acid. The content of the resin capable of forming hydrogen bonds with boric acid in the binder resin is preferably 50 to 90% by mass.

A binder resin other than the resin capable of forming hydrogen bonds with boric acid is not particularly limited and known ones can be used.

In addition, when the toner particle has a shell, the shell can be made of the same resin as the resin capable of forming hydrogen bonds with boric acid. For example, in the shell-forming step described below, a shell-forming resin can be added to form the shell. A polyester resin is also preferable as the shell-forming resin.

The polyester resin can be obtained by selecting and combining suitable components from among polyvalent carboxylic acids, polyols, hydroxycarboxylic acids, and the like, and performing synthesis by using a conventionally known method such as a transesterification method or a polycondensation method.

A polyvalent carboxylic acid is a compound containing two or more carboxy groups in one molecule. Of these, a dicarboxylic acid, which is a compound comprising two carboxy groups in one molecule, is preferably used.

Examples of the dicarboxylic acid include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid, cyclohexanedicarboxylic acid, and the like.

In addition, examples of the polyvalent carboxylic acid other than the dicarboxylic acid include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecyl succinic acid, n-dodecenyl succinic acid, isododecyl succinic acid, isododecenyl succinic acid, n-octyl succinic acid, n-octenyl succinic acid, and the like. These may be used alone or in combination of two or more.

A polyol is a compound containing two or more hydroxyl groups in one molecule. Of these, a diol, which is a compound containing two hydroxyl groups in one molecule, is preferably used for synthesis of the above polyester resins.

Specific examples of the diol include ethylene glycol, diethylene glycol, triethylene glycol, 1,2-propylene glycol, 1,3-propylene glycol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, diethylene glycol, triethylene glycol, dipropylene glycol, polyethylene glycol, polypropylene glycol, polytetramethylene ether glycol, 1,4-cyclohexanediol, 1,4-cyclohexanedimethanol, 1,4-butenediol, neopentyl glycol, 1,4-cyclohexanediol, polytetramethylene glycol, hydrogenated bisphenol A, bisphenol A, bisphenol F, bisphenol S, alkylene oxide (ethylene oxide, propylene oxide, butylene oxide, and the like) adducts of the above bisphenols, and the like.

Of these, the preferred are alkylene glycols having 2 to 12 carbon atoms and alkylene oxide adducts of bisphenols, and particularly preferable ones are alkylene oxide adducts of bisphenols and combinations thereof with alkylene glycols having 2 to 12 carbon atoms.

Examples of trivalent or higher alcohol include glycerin, trimethylolethane, trimethylolpropane, pentaerythritol, hexamethylolmelamine, hexaethylolmelamine, tetramethylolbenzoguanamine, tetraethylolbenzoguanamine, sorbitol, trisphenol PA, phenol novolac, cresol novolak, alkylene oxide adducts of the above trivalent or higher polyphenols, and the like. These may be used alone or in combination of two or more.

Examples of the styrene acrylic resin include homopolymers composed of the following polymerizable monomers, copolymers obtained by combining two or more of these, or mixtures thereof.

Styrene-based monomers such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, and p-phenylstyrene;

- (meth)acrylic monomers such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth) acrylate, cyclohexyl (meth)acrylate, benzyl (meth) acrylate, dimethyl phosphate ethyl (meth)acrylate, diethyl phosphate ethyl (meth)acrylate, dibutyl phosphate ethyl (meth)acrylate and 2-benzoyloxyethyl (meth)acrylate, (meth)acrylonitrile, 2-hydroxyethyl (meth)acrylate, (meth)acrylic acid, and maleic acid;
- vinyl ether monomers such as vinyl methyl ether and vinyl isobutyl ether;
- vinyl ketone monomers such as vinyl methyl ketone, vinyl ethyl ketone, vinyl isopropenyl ketone, and the like; and
- polyolefins such as ethylene, propylene, butadiene, and the like.

A polyfunctional polymerizable monomer can be used, if necessary, for the styrene acrylic resin.

Examples of the polyfunctional polymerizable monomer include diethylene glycol di(meth)acrylate, triethylene glycol di(meth)acrylate, tetraethylene glycol di(meth)acrylate, polyethylene glycol di(meth)acrylate, 1,6-hexanediol di(meth)acrylate, neopentyl glycol di(meth)acrylate, tripropylene glycol di(meth)acrylate, polypropylene glycol di(meth)acrylate, 2,2'-bis(4-((meth)acryloxydiethoxy)phenyl)propane, trimethylolpropane tri(meth)acrylate, tetramethylolmethane tetra(meth)acrylate, divinylbenzene, divinylnaphthalene, divinyl ether, and the like.

Further, in order to control the degree of polymerization, it is also possible to further add a known chain transfer agent and a known polymerization inhibitor.

Examples of the polymerization initiator for obtaining the styrene acrylic resin include organic peroxide-based initiators and azo-based polymerization initiators.

Examples of the organic peroxide-based initiator include benzoyl peroxide, lauroyl peroxide, di-α-cumyl peroxide, 2,5-dimethyl-2,5-bis(benzoylperoxy)hexane, bis (4-t-butylcyclohexyl)peroxydicarbonate, 1,1-bis(t-butylperoxy)cyclododecane, t-butylperoxymaleic acid, bis(t-butylperoxy) isophthalate, methyl ethyl ketone peroxide, tert-butylperoxy-2-ethylhexanoate, diisopropylperoxycarbonate, cumene hydroperoxide, 2,4-dichlorobenzoyl peroxide, tert-butyl-peroxypivalate, and the like.

Examples of the azo-based polymerization initiator include 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobismethylbutyronitrile, 2,2'-azobis-(methyl isobutyrate), and the like.

Further, as the polymerization initiator, a redox-based initiator in which an oxidizing substance and a reducing substance are combined can also be used.

Examples of the oxidizing substance include hydrogen peroxide, an inorganic peroxide of a persulfate (sodium salt, potassium salt and ammonium salt), and an oxidizing metal salt of a tetravalent cerium salt.

Examples of the reducing substance include reducing metal salts (divalent iron salt, monovalent copper salt and trivalent chromium salt), ammonia, lower amines (amines having from 1 to 6 carbon atoms such as methylamine and ethylamine), amine compounds such as hydroxylamine, reducing sulfur compounds such as sodium thiosulfate, sodium hydrosulfite, sodium hydrogen sulfite, sodium sulfite, sodium formaldehyde sulfoxylate, lower alcohols (having 1 to 6 carbon atoms), ascorbic acid or salts thereof and lower aldehydes (having 1 to 6 carbon atoms).

The polymerization initiator is selected with reference to a 10-h half-life temperature, and is used alone or in combination. The amount of the polymerization initiator added varies depending on the desired degree of polymerization but is generally from 0.5 to 20.0 parts by mass with respect to 100.0 parts by mass of the polymerizable monomers.

Release Agent

A known wax can be used as the release agent for the toner particle.

Specific examples include petroleum-based waxes represented by paraffin wax, microcrystalline wax, petrolactam, and derivatives thereof, montan wax and derivatives thereof, hydrocarbon waxes obtained by a Fischer-Tropsch method and derivatives thereof, polyolefin waxes represented by polyethylene and derivatives thereof, natural waxes represented by carnauba wax and candelilla wax and derivatives thereof, the derivatives including oxides, block copolymers with vinyl monomers, and graft modified products.

Other examples include alcohols such as higher fatty alcohols, fatty acids such as stearic acid, palmitic acid, and the like or acid amides, esters and ketones thereof, hardened castor oil and derivatives thereof, vegetable waxes, and animal waxes. These can be used alone or in combination.

Among these, it is preferable to use a polyolefin, a hydrocarbon wax produced by the Fischer-Tropsch method, or a petroleum-based wax because the developing performance and transferability tend to be improved. An antioxidant may be added to these waxes within a range in which the effects of the toner of the present invention are not affected.

The content of the release agent is preferably 1.0 to 30.0 parts by mass with respect to 100.0 parts by mass of the binder resin.

The melting point of the release agent is preferably 30 to 120° C., more preferably 60 to 100° C. By using the release agent exhibiting the thermal properties as described above, the release effect is efficiently exhibited, and a wider fixing area is ensured.

Plasticizer

It is preferable to use a crystalline plasticizer for the toner particle in order to improve a sharp melt property. The plasticizer is not particularly limited, and known ones suitable for toners as described below can be used.

Specific examples include esters of monohydric alcohols and aliphatic carboxylic acids such as behenyl behenate, stearyl stearate, and palmityl palmitate, or esters of monovalent carboxylic acids and aliphatic alcohols; esters of dihydric alcohols and aliphatic carboxylic acids such as ethylene glycol distearate, dibehenyl sebacate, and hexanediol dibehenate, or esters of divalent carboxylic acids and aliphatic alcohols; esters of thihydric alcohols and aliphatic carboxylic acids such as glycerin tribehenate, or esters of trivalent carboxylic acids and aliphatic alcohols; esters of tetrahydric alcohols and aliphatic carboxylic acids such as pentaerythritol tetrastearate and pentaerythritol tetrapalmitate, or esters of tetravalent carboxylic acids and aliphatic alcohols; esters of hexahydric alcohols and aliphatic carboxylic acids such as dipentaerythritol hexastearate and dipentaerythritol hexapalmitate, or esters of hexavalent carboxylic acids and aliphatic alcohols; esters of polyhydric alcohols and aliphatic carboxylic acids such as polyglycerin behenate, or esters of polyvalent carboxylic acids and aliphatic alcohols; and natural ester waxes such as carnauba wax and rice wax. These can be used alone or in combination.

The content of the plasticizer is preferably 1.0 to 50.0 parts by mass, more preferably 5.0 to 30.0 parts by mass, with respect to 100.0 parts by mass of the binder resin.

Colorant

The toner particle may comprises a colorant. Known pigments and dyes can be used as the colorant. Pigments are preferable as the colorant from the viewpoint of excellent weather resistance.

Examples of cyan-based colorants include copper phthalocyanine compounds and derivatives thereof, anthraquinone compounds, basic dye lake compounds, and the like.

Specifically examples include C. I. Pigment Blue 1, 7, 15, 15:1, 15:2, 15:3, 15:4, 60, 62, and 66.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds, perylene compounds, and the like.

Specifically examples include C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, and 254, and C. I. Pigment Violet 19.

Examples of yellow colorants include condensed azo compounds, isoindolinone compounds, anthraquinone compounds, azo metal complexes, methine compounds, and allylamide compounds.

Specific examples include C. I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Examples of black colorants include carbon black and those colored black using the above-mentioned yellow colorant, magenta colorant and cyan colorant.

These colorants can be used alone or as a mixture, and they can be used in the form of a solid solution.

It is preferable to use 1.0 to 20.0 parts by mass of the colorant (other than the magnetic body) with respect to 100.0 parts by mass of the binder resin.

Magnetic bodies can also be contained as a colorant.

Examples of magnetic bodies include magnetic iron oxides such as magnetite, maghemite, ferrite, and the like; metals such as iron, cobalt, and nickel, alloys of these metals with metals such as aluminum, copper, magnesium, tin, zinc, beryllium, calcium, manganese, selenium, titanium, tungsten, vanadium, and the like, mixtures thereof, and the like.

The content of the magnetic bodies is preferably 20 to 100 parts by mass, more preferably 25 to 90 parts by mass, with respect to 100 parts by mass of the binder resin.

Charge Control Agent and Charge Control Resin

The toner particle may include a charge control agent or a charge control resin.

As the charge control agent, known ones can be used, and in particular, a charge control agent having a high triboelectric charge speed and capable of stably maintaining a constant triboelectric charge quantity is preferable. Further, when the toner particles are produced by the suspension polymerization method, a charge control agent having a low polymerization inhibitory property and providing substantially no solubilized material in an aqueous medium is particularly preferable.

Example of charge control agents that that control the toner to negative-charging include monoazo metal compounds, acetylacetone metal compounds, metal compounds of aromatic hydroxycarboxylic acids, aromatic dicarboxylic acids, hydroxycarboxylic acids and dicarboxylic acids, aromatic hydroxycarboxylic acids, aromatic mono and polycarboxylic acids, and metal salts, anhydrides, and esters thereof, phenol derivatives such as bisphenol, urea derivatives, metal-containing salicylic acid-based compounds, metal-containing naphthoic acid-based compounds, boron compounds, quaternary ammonium salts, calixarene, charge control resins, and the like.

Meanwhile, examples of charge control agents that control toner particles to be positively charged include the following.

Nigrosine and nigrosine modifications such as fatty acid metal salts; guanidine compounds; imidazole compounds; onium salts such as quaternary ammonium salts, for example, tributylbenzylammonium-1-hydroxy-4-naphthosulfonate and tetrabutylammonium tetrafluoroborate, phosphonium salts which are analogues thereof, and lake pigments thereof; triphenylmethane dyes and lake pigments thereof (examples of lake agents include phosphotungstic acid, phosphomolybdic acid, phosphotungsticmolybdic acid, tannic acids, gallic acid, ferricyanide, ferrocyanide, and the like); metal salts of higher fatty acid; and resin charge control agents.

These charge control agents or charge control resins may be added alone or in combination of two or more.

The amount of the charge control agent or charge control resin added is preferably 0.01 to 20.0 parts by mass, and more preferably 0.5 to 10.0 parts by mass with respect to 100.0 parts by mass of the binder resin.

External Additive

Other external additives may be added to the toner particle as needed.

Examples of external additives include charge aids, conductivity-imparting agents, flowability-imparting agents, anti-caking agents, release agents for hot roller fixing, lubricants, and fine resin particles and inorganic fine particles that act as abrasives.

Specific examples include the following: raw silica fine particles such as wet silica and dry silica, or surface-treated silica fine particles obtained by subjecting such raw silica fine particles to surface treatment with a treatment agent such as a silane coupling agent, a titanium coupling agent, silicone oil, and the like; strontium titanate fine particles; resin fine particles such as vinylidene fluoride fine particles, polytetrafluoroethylene fine particles, and the like; and the like.

Examples of lubricants include polyethylene fluoride powder and polyvinylidene fluoride powder. Examples of abrasives include cerium oxide powder, silicon carbide powder, and strontium titanate powder.

The content of the external additive is preferably 0.1 to 5.0 parts by mass with respect to 100.0 parts by mass of the toner particles.

Method for Producing Toner

A method for producing the toner is not particularly limited, and known methods such as a pulverization method, a suspension polymerization method, a dissolution suspension method, an emulsion aggregation method, and a dispersion polymerization method can be used.

The toner of the present disclosure is preferably produced by a method having the steps shown below. That is, the toner of the present disclosure is preferably produced by an emulsion aggregation method.

(1) A dispersing step of preparing a dispersion liquid of binder resin fine particle comprising a resin capable of forming hydrogen bonds with boric acid.

(2) An aggregation step of aggregating the binder resin fine particle comprising a resin capable of forming hydrogen bonds with the boric acid in the dispersion liquid to form aggregates.

(3) A fusion step of heating and fusing the aggregates.

Of the above steps, it is preferable to add borax in any of the steps after (1). In particular, it is more preferable to add borax in the aggregation step (2).

Producing the toner by the emulsion aggregation method is preferable in that the shape of the toner can be controlled and the distribution of boric acid inside the toner particle can be easily controlled.

The details of the emulsion aggregation method will be described below.

Emulsion Aggregation Method

With the emulsion aggregation method, an aqueous dispersion of fine particles composed of constituent materials of toner particles, which are sufficiently small as compared with the target particle diameter, is prepared in advance, these fine particles are aggregated in an aqueous medium until the particle diameter of the toner particles is reached, and the resin is fused by heating or the like to produce toner particles.

That is, in the emulsion aggregation method, toner particles are produced through a dispersion step of preparing a fine particle-dispersed solution composed of constituent materials of toner particles, an aggregation step of aggregating the fine particles composed of constituent materials of toner particles to control the particle diameter until the particle diameter of the toner particles is reached, a fusion step of fusing the resin contained in the obtained aggregated particles, a spheroidization step of melting by further heating or the like to control the surface shape of the toner, a subsequent cooling step, a metal removal step of sorting the obtained toner and removing excess polyvalent metal ions, a filtering/washing step of washing with ion-exchanged water or the like, and a step of removing moisture from the washed toner particles and drying.

Each fine particle dispersion liquid prepared in the dispersion step and made up of the constituent materials of the toner particles can be prepared, for example, by the following method.

Resin Fine Particle-Dispersed Solution

The resin fine particle-dispersed solution can be prepared by known methods, but is not limited to these methods. Known methods include, for example, an emulsion polymerization method, a self-emulsification method, a phase inversion emulsification method in which an aqueous medium is added to a resin solution obtained by dissolving in an organic solvent to emulsify the resin, or a forced emulsification method in which a resin is forcibly emulsified by high-temperature treatment in an aqueous medium without using an organic solvent, and the like.

Specific examples are shown below, but these methods are not limiting.

The binder resin is dissolved in an organic solvent capable of dissolving the binder resin, and a surfactant or a basic compound is added. At that time, where the binder resin is a crystalline resin having a melting point, melting is performed by heating to or above the melting point. Subsequently, an aqueous medium is slowly added while stirring with a homogenizer or the like to precipitate the resin fine particles. Then, the solvent is removed by heating or reducing the pressure to prepare an aqueous dispersion liquid of resin fine particles.

As the organic solvent to be used to dissolve the binder resin, any organic solvent that can dissolve the binder resin can be used, but from the viewpoint of suppressing the generation of coarse powder, it is preferable to use an organic solvent, such as toluene, that forms a uniform phase with water.

The surfactant is not particularly limited, and examples thereof include anionic surfactants such as sulfuric acid esters and salts, sulfonic acid salts, carboxylic acid salts, phosphoric acid esters, soaps, and the like; cationic surfactants such as amine salts, quaternary ammonium salts, and the like; and nonionic surfactants such as polyethylene glycols, alkylphenol ethylene oxide adducts, polyhydric alcohols, and the like. The surfactants may be used alone or in combination of two or more.

Examples of basic compounds include, but are not limited to, inorganic bases such as sodium hydroxide, potassium hydroxide, and the like, and organic bases such as ammonia, triethylamine, trimethylamine, dimethylaminoethanol, diethylaminoethanol, and the like. Basic compounds may be used singly or in combination of two or more.

The 50% particle diameter (D50) based on volume distribution of the binder resin fine particles in the resin fine particle aqueous dispersion liquid is preferably 0.05 to 1.00 μm, more preferably 0.05 to 0.40 μm. By adjusting the 50% particle diameter (D50) based on volume distribution of the binder resin fine particles to the above range, it becomes easy to obtain toner particles having a volume-average particle diameter of 3 to 10 μm, which is suitable for toner particles.

The 50% particle diameter (D50) based on volume distribution is measured using a laser diffraction/scattering particle diameter distribution measuring device by the method described below.

The content of the binder resin fine particles in the resin fine particle dispersion liquid is not particularly limited, but it is preferably 1 to 30% by mass with respect to the total mass of the binder resin fine particle dispersion liquid.

Colorant Fine Particle Dispersion Liquid

A colorant fine particle dispersion liquid may be added as necessary. The colorant fine particle dispersion liquid can be prepared by a known method. For example, it can be prepared by the following methods, but is not limited to these methods.

A colorant, an aqueous medium and a dispersing agent are mixed with a known mixer such as a stirrer, an emulsifier and a disperser. Known dispersing agents such as surfactants and polymer dispersing agents can be used as the dispersing agent used herein. Both surfactants and polymeric dispersing agents can be removed in the cleaning step described below, but surfactants are preferred from the viewpoint of cleaning efficiency.

Examples of the surfactant include anionic surfactants such as sulfuric acid esters and salts, sulfonic acid salts, phosphoric acid esters, soaps, and the like, cationic surfactants such as amine salts and quaternary ammonium salts, and nonionic surfactants such as polyethylene glycols, alkylphenol ethylene oxide adducts, and polyhydric alcohols.

Among these, nonionic surfactants or anionic surfactants are preferred. Moreover, a nonionic surfactant and an anionic surfactant may be used together. Surfactants may be used singly or in combination of two or more.

The concentration of the surfactant in the aqueous medium is preferably 0.5 to 5% by mass. Although the content of the colorant fine particles in the colorant fine particle dispersion liquid is not particularly limited, it is preferably 1 to 30% by mass based on the total mass of the colorant fine particle dispersion liquid.

The 50% particle diameter (D50) based on volume distribution of the colorant fine particles in the colorant aqueous dispersion liquid is preferably 0.5 μm or less. When the 50% particle diameter (D50) based on volume distribution of the colorant fine particles is within the above range, the dispersibility of the colorant inside the toner is improved. The dispersed particle diameter of the colorant fine particles dispersed in the aqueous medium is measured by a laser diffraction/scattering particle diameter distribution measuring device by the method described below.

Examples of mixers such as known stirrers, emulsifiers, and dispersers used to disperse colorants in aqueous media include ultrasonic homogenizers, jet mills, pressure homogenizers, colloid mills, ball mills, sand mills, and paint shakers. These may be used alone or in combination.

Release Agent (Aliphatic Hydrocarbon Compound) Fine Particle Dispersion Liquid

A release agent fine particle dispersion liquid may be used as necessary. The release agent fine particle dispersion liquid can be prepared by a known method. For example, it can be prepared by the following methods, but is not limited to these methods.

The release agent fine particle dispersed-solution can be prepared by adding a release agent to an aqueous medium including a surfactant, heating to or above the melting point of the release agent and dispersing in particles with a homogenizer having a strong shearing ability (for example, "CLEARMIX W MOTION" manufactured by M Technique Co., Ltd.) or a pressure discharge type disperser (for example, "Gaulin Homogenizer" manufactured by Gaulin Co., Ltd.) and then cooling to a temperature below the melting point.

The dispersed particle diameter of the release agent fine particle dispersed-solution in the aqueous dispersion liquid of the release agent is preferably from 0.03 to 1.0 μm, and more preferably from 0.1 to 0.5 μm in the 50% particle diameter (D50) based on the volume distribution. Further, it is preferable that there be no coarse particles of 1 μm or more.

When the dispersed particle diameter of the release agent fine particle dispersed-solution is within the above range, the release agent can be present in the toner in a finely dispersed state, the out-migration effect at the time of fixing is maximized, and good releasability can be obtained. The dispersed particle diameter of the release agent fine particle dispersion liquid dispersed in the aqueous medium can be measured by the method described hereinbelow by using a laser diffraction/scattering particle diameter distribution measuring device.

Mixing Step

In the mixing step, a mixed solution in which the resin fine particle-dispersed solution and, if necessary, at least one of the release agent fine particle dispersed-solution and the colorant fine particle dispersed-solution are mixed is prepared. This can be done using a known mixing device such as a homogenizer and a mixer.

Step of Forming Aggregate Particles (Aggregation Step)

In the aggregation step, the fine particles contained in the mixed solution prepared in the mixing step are aggregated to form an aggregate having a target particle diameter. At this time, by adding and mixing a flocculant and adding, as appropriate, at least one of heating and mechanical power as necessary, an aggregate is formed in which the resin fine particles and, if necessary, at least one of the release agent fine particles and the colorant fine particles are aggregated.

Examples of the flocculant include organic flocculants such as quaternary-salt cationic surfactants, polyethyleneimine, and the like; an inorganic metal salts such as sodium sulfate, sodium nitrate, sodium chloride, calcium chloride, calcium nitrate, and the like; inorganic ammonium salts such as ammonium sulfate, ammonium chloride, ammonium nitrate, and the like; and inorganic flocculants such as divalent or higher metal complexes and the like.

It is also possible to add an acid to lower the pH and cause weak flocculation. For example, sulfuric acid or nitric acid can be used. The pH is preferably 3.5 or less.

The flocculant may be added in the form of a dry powder or as an aqueous solution obtained by dissolving in an aqueous medium. It is preferable to add the flocculant in the form of an aqueous solution in order to cause uniform aggregation.

It is preferable that the flocculant be added and mixed at a temperature equal to or lower than the glass transition temperature or the melting point of the resin contained in the mixed solution. By mixing under these temperature conditions, aggregation proceeds relatively uniformly. Mixing of the flocculant into the mixed solution can be performed using a known mixing device such as a homogenizer and a mixer. The aggregation step is a step of forming a toner particle-sized aggregate in an aqueous medium. The volume average particle diameter of the aggregates produced in the aggregation step is preferably from 3 to 10 μm. The volume average particle diameter can be measured by a particle size distribution analyzer (Coulter Multisizer III: manufactured by Beckman Coulter, Inc.) by the Coulter method.

Shell-Forming Step

The shell-forming step may be performed after the aggregation step. The shell-forming step is a step of newly adding and attaching resin fine particles to the particles (also referred to as core particles) produced in the previous steps to form a shell. Ion-exchanged water and a resin particle dispersion liquid are added to the dispersion liquid after the aggregation step, and the mixture is stirred for 1 h to form a shell. The amount of the resin particle dispersion liquid to be added is not particularly limited, but it is preferable, for example, to add 1 to 5% by mass of the resin particle dispersion liquid relative to the total amount of the dispersion liquid.

The resin fine particles comprised in the resin particle dispersion liquid to be added may have the same structure as the binder resin fine particles used in the core particles, or may have a different structure.

Before the shell-forming step, a pre-shell-forming step of adding an aqueous borax solution in which borax is dissolved in an aqueous medium may be performed. Although the concentration of the borax aqueous solution is not particularly limited, it is preferably 5.0 to 15.0% by mass. Although the amount of the borax aqueous solution added is not particularly limited, it is preferable, for example, to add from 1 to 6% by mass of the borax aqueous solution relative to the total amount of the dispersion liquid.

By adding the borax aqueous solution before the shell-forming step, it becomes easier to obtain a toner particle that comprises boric acid in the region near the surface inside the toner core particle and that has almost no boron element on the surface of the toner core particle.

Step of Obtaining Dispersion Liquid Including Toner Particles (Fusing Step)

First, the aggregation of the dispersion liquid comprising the aggregates obtained in the aggregation step is terminated. The aggregation is terminated by adding an aggregation terminator such as a base capable of adjusting the pH, a chelate compound, or an inorganic salt compound such as sodium chloride under the same agitation as in the aggregation step.

After the dispersed state of the aggregated particles in the dispersion liquid is stabilized by the action of the aggregation terminator, the aggregated particles are fused and adjusted to the desired particle diameter by heating to the glass transition temperature or melting point of the binder resin or higher. The weight-average particle diameter (D4) of the toner particles is preferably 3 to 10 μm.

Cooling Step

If necessary, a cooling step may be performed in which the temperature of the dispersion liquid comprising the toner particles obtained in the fusion step is lowered to a temperature lower than at least one of the crystallization temperature and the glass transition temperature of the binder resin. By cooling to a temperature lower than at least one of the crystallization temperature and the glass transition temperature, the generation of dents on the toner surface can be suppressed.

Post-Treatment Step

Furthermore, a post-treatment step such as a washing step, a solid-liquid separation step, a drying step, and a classification step may be performed. By performing the post-treatment step, toner particles in a dry state are obtained.

External Addition Step

A fatty acid metal salt is externally added to the toner after the post-treatment step. Also, if necessary, other external additives may be added in addition to the fatty acid metal salt. External addition can be performed by adding an external additive to toner particles and using a known mixing device such as a Henschel mixer.

Examples of external additives include charging aids, conductivity-imparting agents, flowability-imparting agents, anti-caking agents, release agents for hot roller fixing, lubricants, and resin fine particles and inorganic fine particles that act as abrasives.

Examples of lubricants include polyethylene fluoride powder and polyvinylidene fluoride powder. Polyvinylidene fluoride powder is particularly preferred.

Examples of abrasives include cerium oxide powder, silicon carbide powder, and strontium titanate powder.

The external addition and mixing time when externally adding the fatty acid metal salt to the toner particles is preferably from 3 to 10 min. Further, the amount of the fatty acid metal salt to be added is preferably 0.05 to 1.0 parts by mass with respect to 100.0 parts by mass of the toner particles.

Next, methods for measuring physical properties will be described.

IR Analysis of Toner Particles by ATR Method Using Germanium (Ge) for ATR Crystal ATR-IR analysis of toner particles is performed by the following method.

IR analysis is performed by the ATR method using a Fourier transform infrared spectroscopic analyzer (Spectrum One: manufactured by PerkinElmer Co.) equipped with a universal ATR measurement accessory (Universal ATR Sampling Accessory). The specific measurement procedure is as follows.

The incident angle of infrared light (λ=5 μm) is set to 45°. As the ATR crystal, a Ge ATR crystal (refractive index=4.0) is used. Other conditions are as follows.

Range

Start: 4000 $cm^{-1}$

End: 650 $cm^{-1}$ (Ge ATR crystal)

Duration

Scan number: 16

Resolution: 4.00 $cm^{-1}$

Advanced: with $CO_2/H_2O$ correction (1) Ge ATR crystal (refractive index=4.0) is attached to the apparatus.

(2) Scan type is set to Background, Units are set to EGY, and the background is measured.

(3) Scan type is set to Sample, and Units are set to A.

(4) A total of 0.01 g of toner particles is weighed on the ATR crystal.

(5) The sample is pressurized with a pressure arm (Force Gauge is 90).

(6) The sample is measured.

Boric acid comprised in the toner particle is identified by the following method.

An infrared absorption spectrum can be used to confirm whether the toner particle comprises boric acid. Specifically, potassium bromide (KBr) is mixed with an appropriate amount of sample resin of toner particles and molded, and the infrared absorption spectrum is measured. Since the oscillation of boric acid has an absorption wavelength at 1380 $cm^{-1}$, when an absorption peak is detected at 1380 cm $cm^{-1}$, it is determined that a peak corresponding to boric acid has been detected.

Method for Measuring Content of Boron in Toner

Regarding the measurement of boron content in the toner, it is measured by fluorescent X-rays and obtained by the calibration curve method. Measurement of fluorescent X-rays of boron conforms to JIS K 0119-1969, and the specific procedure thereof is as follows.

As the measurement device, a wavelength dispersive X-ray fluorescence spectrometer "Axios" (manufactured by PANalytical) and software "SuperQ ver. 4.0F" (manufactured by PANalytical) for setting measurement conditions and analyzing measurement data, which is provided together with the spectrometer, are used. Rh is used as the anode of the X-ray tube, the measurement atmosphere is vacuum, and the measurement diameter (collimator mask diameter) is 27 mm. A proportional counter (PC) is used to measure light elements, and a scintillation counter (SC) is used to measure heavy elements.

Preparation of Calibration Curve for Boron Element

A pellet for preparing a calibration curve is prepared by adding 0.10 parts by mass of borax $[Na_2(B_4O_5(OH)_4)\cdot 8H_2O]$ to 100 parts by mass of binder [trade name: Spectro Blend, components: C: 81.0, O: 2.9, H: 13.5, N: 2.6 (% by mass), chemical formula: $C_{19}H_{38}ON$, shape: powder (44 μm); manufactured by Rigaku Co., Ltd.], thoroughly mixing using a coffee mill, placing 4 g of the mixture in a special aluminum ring for pressing, leveling, pressing at 20 MPa for 60 sec with a tablet molding compressor "BRE-32" (manufactured by Mayekawa Test Instruments Co., Ltd.), and molding to a thickness of 2 mm and a diameter of 39 mm. Similarly, 0.50 parts by mass, 1.00 part by mass, 5.00 parts by mass, and 10.00 parts by mass of borax are mixed and pelletized to prepare respective pellets, and the count rate (unit: cps) of B-Kα rays observed at a diffraction angle (20) of 41.75° when PET is used as an analyzing crystal is measured. At this time, the acceleration voltage and current value of the X-ray generator are set to 32 kV and 125 mA, respectively, and the measurement time is set to 10 sec.

A linear function calibration curve is obtained with the obtained X-ray count rate plotted on the ordinate and the boron addition concentration calculated from the amount of borax added in each sample for calibration curve plotted on the abscissa.

Quantification of Boron Element and Boron Content in Toner

In order to quantify the boron element content in the toner, 4 g of the toner is placed in an aluminum ring for exclusive pressing and pelletized in the same manner as the sample for creating the calibration curve. The molded toner pellets are measured under the same conditions as for the calibration curve sample, and the boron element content (ppm) relative to the toner is obtained from the prepared calibration curve. Also, the number of moles and the boron content C (mol/μg) in the toner are calculated from the boron element content in the toner.

Method for Measuring Contents of Various Metal Elements in Toner Preparation of Calibration Curve for Elemental Aluminum and Determination of Elemental Aluminum in Toner A calibration curve sample is prepared in the same process as above, except that aluminum hydroxide $(Al(OH)_3)$ is used instead of borax. The acceleration voltage of the X-ray generator and the current value are set to 32 kV and 125 mA, respectively, the measurement time is set to 10 sec, and the count rate (unit: cps) of Al-Kα rays observed at a diffraction angle (20) of 144.8° when PET is used as an analyzing crystal is measured to obtain a calibration curve for first-order correlation with the concentration of added elemental aluminum.

To quantify the content of elemental aluminum in the toner, a toner sample is prepared in the same manner as in the quantification of boron element, the measurement is performed under the same conditions as the calibration curve sample, and the content of elemental aluminum (ppm by mass) in the toner is obtained from the calibration curve. Also, the number of moles is calculated from the content with respect to the toner.

Preparation of Calibration Curve for Elemental Magnesium and Determination of Elemental Magnesium in Toner A calibration curve sample is prepared in the same process as above, except that magnesium hydroxide $(Mg(OH)_2)$ is used instead of borax. The acceleration voltage of the X-ray generator and the current value are set to 32 kV and 125 mA, respectively, the measurement time is set to 50 sec, and the count rate (unit: cps) of Mg-Kα rays observed at a diffraction angle (20) of 22.93° when PET is used as an analyzing crystal is measured to obtain a calibration curve for first-order correlation with the concentration of added elemental magnesium.

To quantify the content of elemental magnesium in the toner, a toner sample is prepared in the same manner as in the quantification of boron element, the measurement is performed under the same conditions as the calibration curve sample, and the content of elemental magnesium (ppm by mass) in the toner is obtained from the calibration curve. Also, the number of moles is calculated from the content with respect to the toner.

Preparation of Calibration Curve for Elemental Calcium and Determination of Elemental Calcium in Toner A calibration curve sample is prepared in the same process as above, except that calcium hydroxide $(Ca(OH)_2)$ is used instead of borax. The acceleration voltage of the X-ray generator and the current value are set to 32 kV and 125 mA, respectively, the measurement time is set to 10 sec, and the count rate (unit: cps) of Ca-Kα rays observed at a diffraction angle (20) of 113.0° when PET is used as an analyzing crystal is measured to obtain a calibration curve for first-order correlation with the concentration of added elemental calcium.

To quantify the content of elemental calcium in the toner, a toner sample is prepared in the same manner as in the quantification of boron element, the measurement is performed under the same conditions as the calibration curve sample, and the content of elemental calcium (ppm by mass) in the toner is obtained from the calibration curve. Also, the number of moles is calculated from the content with respect to the toner.

Preparation of Calibration Curve for Elemental Zinc and Determination of Elemental Zinc in Toner A calibration curve sample is prepared in the same process as above, except that zinc hydroxide $(Zn(OH)_2)$ is used instead of borax. The acceleration voltage of the X-ray generator and the current value are set to 60 kV and 66 mA, respectively, the measurement time is set to 10 sec, and the count rate (unit: cps) of Zn-Kα rays observed at a diffraction angle (2θ) of 41.74° when PET is used as an analyzing crystal is measured to obtain a calibration curve for first-order correlation with the concentration of added elemental zinc.

To quantify the content of elemental zinc in the toner, a toner sample is prepared in the same manner as in the quantification of boron element, the measurement is performed under the same conditions as the calibration curve sample, and the content of elemental zinc (ppm by mass) in the toner is obtained from the calibration curve. Also, the number of moles is calculated from the content with respect to the toner.

Preparation of Calibration Curve for Elemental Barium and Determination of Elemental Barium in Toner A calibration curve sample is prepared in the same process as above, except that barium hydroxide $(Ba(OH)_2)$ is used instead of borax. The acceleration voltage of the X-ray generator and the current value are set to 60 kV and 66 mA, respectively, the measurement time is set to 10 sec, and the count rate unit: cps) of Ba-Kα rays observed at a diffraction angle (2θ) of 141.74° when PET is used as an analyzing crystal is measured to obtain a calibration curve for first-order correlation with the concentration of added elemental barium.

To quantify the content of elemental barium in the toner, a toner sample is prepared in the same manner as in the quantification of boron element, the measurement is performed under the same conditions as the calibration curve sample, and the content of elemental barium (ppm by mass) in the toner is obtained from the calibration curve. Also, the number of moles is calculated from the content with respect to the toner.

Preparation of Calibration Curves of Other Metal Elements and Quantification of the Metal Elements in Toner Particle When measuring elements other than the above with fluorescent X-rays, the product of the tube voltage (kV) and the tube current (mA) of the tube lamp of the X-ray generator is set to 4.0 kW and the measurement time is set to 10 sec.

The total content of each metal element in the toner obtained by the above method is defined as the metal element content A (mol/μg) in the toner.

Measurement of Presence Ratio of Boron Element on Toner Particle Surface

The presence ratio of boron element on the surface of the toner particle is measured by X-ray photoelectron spectroscopy. Elemental analysis of the surface of the toner particle is performed using the following device under the following conditions.

Measuring device: Quantum 2000 (trade name, manufactured by ULVAC-PHI, Inc.)
X-ray source: monochrome Al Kα
Xray setting: 100 μmφ (25 W (15 KV))
Photoelectron extraction angle: 45 degrees
Neutralization condition: combination of neutralization gun and ion gun
Analysis area: 300×200 μm
Pass Energy: 58.70 eV
Step size: 0.125 eV
Analysis software: Maltipak (ULVAC-PHI, Inc.)

The peak derived from the C—C bond of the is orbital of carbon is corrected to 285 eV. After that, the amount of boron element related to the total amount of constituent elements is calculated by using the relative sensitivity factor provided by ULVAC-PHI, Inc. from the peak area derived from the 2p orbital of boron for which the peak top is detected from 452 eV to 468 eV, and the calculated value is taken as the presence ratio (atomic %) of boron element on the toner surface.

Measurement of Weight Average Particle Diameter (D4) and Number Average Particle Diameter (D1) of Toner or Toner Particles The weight-average particle diameter (D4) and the number-average particle diameter (D1) of the toner or toner particles are calculated in the manner described below. A precision particle size distribution measuring apparatus based on a pore electric resistance method with a 100 μm aperture tube (a Coulter Counter Multisizer 3 (registered trademark) produced by Beckman Coulter, Inc.) and dedicated software for the measurement apparatus (Beckman Coulter Multisizer 3 Version 3.51 produced by Beckman Coulter, Inc.) for setting measurement conditions and analysis of measured data are used for measurement. The measurements are carried out using 25,000 effective measurement channels, and then measurement data is analyzed and calculated.

A solution obtained by dissolving special grade sodium chloride in ion exchanged water at a concentration of approximately 1 mass %, such as "ISOTON II" (produced by Beckman Coulter), can be used as an aqueous electrolyte solution used in the measurements.

The dedicated software was set up in the following way before carrying out measurements and analysis.

On the "Standard Operating Method (SOM) alteration" screen in the dedicated software, the total count number in control mode is set to 50,000 particles, the number of measurements is set to 1, and the Kd value is set to the value obtained by using "standard particle 10.0 μm" (Beckman Coulter). By pressing the "Threshold value/noise level measurement button", threshold values and noise levels are automatically set. In addition, the current is set to 1600 μA, the gain is set to 2, the electrolyte solution is set to ISOTON II, and the "Flush aperture tube after measurement" option is checked. On the "Conversion settings from pulse to particle diameter" screen in the dedicated software, the bin interval is set to logarithmic particle diameter, the particle diameter bin is set to 256 particle diameter bin, and the particle diameter range is set to from 2 to 60 μm.

The specific measurement method is as follows.

(1) 200 mL of the aqueous electrolyte solution is placed in a dedicated Multisizer 3 250 mL glass round bottomed beaker, the beaker is set on a sample stand, and a stirring rod is rotated anticlockwise at a rate of 24 rotations/second. By carrying out the "Aperture tube flush" function of the dedicated software, dirt and bubbles in the aperture tube are removed.
(2) 30 mL of the aqueous electrolyte solution is placed in a 100 mL glass flat bottomed beaker. 0.3 mL of a diluted liquid, which is obtained by diluting "Contaminon N" (a 10 mass % aqueous solution of a neutral detergent for cleaning precision measurement equipment, which has a pH of 7 and comprises a non-ionic surfactant, an anionic surfactant and an organic builder, available from Wako Pure Chemical Industries, Ltd.) approximately 3-fold in terms of mass with ion exchanged water, is added to the beaker as a dispersant.
(3) An ultrasonic wave disperser (Ultrasonic Dispersion System Tetra 150 produced by Nikkaki Bios Co., Ltd.) having an electrical output of 120 W, in which two oscillators having an oscillation frequency of 50 kHz are housed so that their phases are staggered by 1800 is prepared. A predetermined amount of ion exchanged water is placed in a water bath in the ultrasonic dispersion system, and 2 mL of Contaminon N is added to this water bath.
(4) The beaker mentioned in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.
(5) While the aqueous electrolyte solution in the beaker mentioned in section (4) above is being irradiated with ultrasonic waves, 10 mg of toner is added a little at a time to the aqueous electrolyte solution and dispersed therein. The ultrasonic wave dispersion treatment is continued for a further 60 seconds. When carrying out the ultrasonic wave dispersion, the temperature of the water bath is adjusted as appropriate to a temperature of from 10° C. to 40° C.

(6) The aqueous electrolyte solution mentioned in section (5) above, in which the toner is dispersed, is added dropwise by means of a pipette to the round bottomed beaker mentioned in section (1) above, which is disposed on the sample stand, and the measurement concentration is adjusted to 5%. Measurements are carried out until the number of particles measured reaches 50,000.

(7) The weight-average particle diameter (D4) and the number-average particle diameter (D1) are calculated by analyzing measurement data using the accompanying dedicated software. The "AVERAGE DIAMETER" on the "ANALYSIS/VOLUME STATISTICAL VALUE (ARITHMETIC MEAN)" screen when the special software is set to graph/volume % is the weight average particle diameter (D4). The "AVERAGE DIAMETER" on the "ANALYSIS/NUMBER STATISTICAL VALUE (ARITHMETIC MEAN)" screen when the special software is set to graph/number % is the number average particle diameter (D1).

Method for Measuring Area Ratio (as) of Release Agent Present in Region Up to 1.0 μm from Contour of Cross Section of Toner Particle As for the distribution state of the release agent (wax) in the toner particle, the cross section of the toner particle is observed with a transmission electron microscope, the area percentage of wax domains is calculated from the cross section of the domains formed by the wax, and the average value for randomly selected 10 toner particles is defined as As.

Specifically, the toner particle is embedded in a visible light-curable embedding resin (D-800, manufactured by Nisshin EM Co., Ltd.), cut to a thickness of 60 nm by an ultrasonic ultramicrotome (EM5, manufactured by Leica), and stained with Ru by using a vacuum staining device (manufactured by Filgen, Inc.).

After that, observation is performed with a transmission electron microscope (H7500, manufactured by Hitachi, Ltd.) at an acceleration voltage of 120 kV. Ten toner particles having a diameter within ±2.0 μm of the weight-average particle diameter are selected as toner particles to be observed, and cross-sectional images thereof are captured. Image processing software (Photoshop 5.0, Adobe Inc.) is used on the obtained images to clarify the distinction between the wax domains and the binder domains.

Masking is performed by so that a region up to 1.0 μm (including the boundary of 1.0 μm) from the contour of the cross section of the toner particle remains unmasked, and the area percentage of the wax domains with respect to the area of the remaining region is calculated. The average value for ten toner particles is taken as As (%).

Measurement of Migration Amount of Fatty Acid Metal Salt Treatment with Dispersion Liquid A total of 160 g of sucrose (manufactured by Kishida Chemical Co., Ltd.) is added to 100 mL of ion-exchanged water and dissolved in a water bath to prepare a sucrose concentrate. A total of 31 g of the sucrose concentrate and 6 mL of Contaminone N (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) are placed in a centrifuge tube (50 ml capacity) to prepare a dispersion liquid. To this dispersion liquid, 1.0 g of toner is added, and toner lumps are loosened with a spatula or the like.

A centrifuge tube is shaken with a shaker (KM Shaker, manufactured by Iwaki Sangyo Co., Ltd.) at 350 spm (strokes per min) for 20 min. After shaking, the solution is transferred to a glass tube (50 mL) for a swing rotor, and separation is performed by a centrifuge (H-9R, manufactured by Kokusan Co., Ltd.) at 3500 rpm for 30 min. Sufficient separation of the toner and the aqueous solution is visually confirmed, and the toner separated in the uppermost layer is collected with a spatula or the like.

The aqueous solution comprising the collected toner is filtered with a vacuum filter and then dried with a dryer for 1 h or longer. The dried product is pulverized with a spatula to obtain a toner treated with the dispersion liquid.

For the toner treated with the dispersion liquid, the amount of metal derived from the fatty acid metal salt is measured using fluorescent X-rays. The migration amount (number of parts) is calculated from the difference in the amount of the element to be measured between the toner treated with the dispersion and the toner before the treatment.

The measurement of fluorescent X-rays of each element conforms to JIS K 0119-1969, and the specific procedure thereof is as follows.

As the measurement device, a wavelength dispersive X-ray fluorescence spectrometer "Axios" (manufactured by PANalytical) and software "SuperQ ver.4.0F" (manufactured by PANalytical) for setting measurement conditions and analyzing measurement data, which is provided together with the spectrometer, are used. Rh is used as the anode of the X-ray tube, the measurement atmosphere is vacuum, the measurement diameter (collimator mask diameter) is 10 mm, and the measurement time is 10 sec. A proportional counter (PC) is used to measure light elements, and a scintillation counter (SC) is used to measure heavy elements.

A pellet prepared by placing 1 g of the toner treated with the dispersion liquid or the initial toner in an aluminum ring exclusive for pressing having a diameter of 10 mm, leveling, pressing at 20 MPa for 60 sec with a tablet molding compressor "BRE-32" (manufactured by Mayekawa Test Instruments Co., Ltd.), and molding to a thickness of 2 mm is used as the measurement sample.

Measurement is performed under the above conditions, the element is identified based on the X-ray peak position obtained, and the concentration thereof is calculated from the count rate (unit: cps), which is the number of X-ray photons per unit time.

Quantification is performed using the calibration curve created by the following method. Fatty acid metal salt fine particles are added to obtain 0.5 parts by mass relative to 100 parts by mass of toner particles and thoroughly mixed using a coffee mill. Similarly, fatty acid metal salt fine particles are mixed with toner particles to obtain 2.0 parts by mass and 5.0 parts by mass of, respectively, and these are used as samples for the calibration curve.

For each sample, a pellet of the sample for the calibration curve is prepared as described above using a tablet press, and the count rate (unit: cps) of Si-Kα rays observed at a diffraction angle (2θ) of 109.08° when PET is used as an analyzing crystal is measured. At this time, the acceleration voltage and current value of the X-ray generator are set to 24 kV and 100 mA, respectively. A linear function calibration curve is obtained with the obtained X-ray count rate plotted on the ordinate and the fatty acid metal salt addition amount calculated in each sample for the calibration curve plotted on the abscissa.

Using the toner pellets to be analyzed, the Si-Kα ray count rate is measured. Then, the content of metal in the toner is obtained from the above calibration curve. The difference between the amount of metal in the toner before treatment calculated by the method described above and the amount of metal in the toner treated with the dispersion liquid is calculated and used as the migration amount (number of parts) based on the mass of the toner particles.

Method for Identifying Binder Resin

Method for Separating Binder Resin from Toner

The toner is dissolved in tetrahydrofuran (THF), and the solvent is distilled off from the resulting soluble matter under reduced pressure to obtain the tetrahydrofuran (TIF) soluble matter of the toner. The tetrahydrofuran (TIF) soluble matter of the toner thus obtained is dissolved in chloroform to prepare a sample solution having a concentration of 25 mg/mL.

A total of 3.5 mL of the obtained sample solution is injected into the below-described device, and under the following conditions, a low molecular weight component derived from the release agent and having a molecular weight of less than 2000 and a high molecular weight component derived from a resin component and having a molecular weight of 2000 or more are fractionated.

Preparative GPC device: Preparative HPLC LC-980 type manufactured by Japan Analytical Industry Co., Ltd.

Preparative column: JAIGEL 3H, JAIGEL 5H (manufactured by Japan Analytical Industry Co., Ltd.)

Eluent: chloroform

Flow rate: 3.5 mL/min

After fractionating the high molecular weight component derived from the resin component, the solvent is distilled off under reduced pressure, and further drying is performed in an atmosphere of 90° C. under reduced pressure for 24 h. The above operation is repeated until about 100 mg of the resin component is obtained.

A total of 500 mL of acetone is added to 100 mg of the resin component obtained by the above operation, heating to 70° C. is performed for complete dissolution, and gradual cooling to 25° C. is thereafter performed to recrystallize the crystalline resin. Then, suction filtration is performed with a syringe equipped with a sample processing filter (pore size from 0.2 μm to 0.5 μm, for example, Myshori Disc H-25-2 (manufactured by Tosoh Corporation)) to separate the crystalline resin and the filtrate.

Then, the separated filtrate is gradually added to 500 mL of methanol to reprecipitate the binder resin derived from the amorphous polyester. After that, the binder resin is taken out with a suction filter similar to that described above. The obtained binder resin is dried under reduced pressure at 40° C. for 24 h.

Method for Identifying Resin Type by NMR

The resin type of the binder resin is specified using nuclear magnetic resonance spectroscopy ($^1$H-NMR) [400 MHz, $CDCl_3$, room temperature (25° C.)] or pyrolysis-GCMS.

(Measurement Conditions for Nuclear Magnetic Resonance Spectroscopy ($^1$H-NMR))

Measurement device: FT NMR device JNM-EX400 (manufactured by JEOL Ltd.)

Measurement frequency: 400 MHz

Pulse condition: 5.0 s

Frequency range: 10,500 Hz

Accumulated times: 64 times

Measurement temperature: 30° C.

Sample: prepared by putting 50 mg of binder resin in a sample tube with an inner diameter of 5 mm, adding deuterated chloroform ($CDCl_3$) as a solvent, and dissolving it in a thermostat at 40° C.

Measurement Conditions for Pyrolysis-GCMS

Measurement device: Pyrolysis-GCMS device

Pyrolyzer: Curie Point Pyrolyzer JPS700 (manufactured by Nippon Analytical Industry Co., Ltd.)

Pyrofoil: F590 (Curie point 590° C.)

GCMS: Focus GC/ISQ (manufactured by Thermo Fisher Scientific Inc.)

Carrier gas: He gas (99.99995% purity)

Column: HP-5MS (30 m, inner diameter 0.25 mm, film thickness 0.25 m)

Inlet temperature: 280° C., MS transfer temperature: 280° C., ion source temperature: 250° C., oven temperature: started at 50° C. and held for 3 min, then raised to 300° C. at 10° C./min and held for 30 min, helium flow rate: 1.2 mL/min constant flow rate control, split ratio: 20:1

MS ion source: EI, MS detection range (m/z): 25 to 800

Library: NIST

Under the above measurement conditions, 0.5 mg of toner and 5 μL of methylation reagent (tetramethylammonium hydroxide 10% methanol solution) are added to Pyrofoil and analyzed.

Method for Confirming Shell Present on Toner Particle Surface A measurement sample is obtained by mixing a visible light-curable embedding resin (D-800, manufactured by Nisshin EM Co., Ltd.) and the toner, pressure molding into a disk shape with a diameter of 7.9 mm and a thickness of 1.0±0.3 mm using a tablet molding machine, and embedding the toner. The conditions for pressure molding are 25° C., 35 MPa, and 60 sec.

Using an ultra-ultramicrotome (EM UC7: manufactured by Leica) equipped with a diamond blade, a thin sample with a film thickness of 100 nm is cut from the above sample at a cutting speed of 0.6 mm/s. The sample obtained is stained with osmium tetroxide. By this operation, the resin capable of forming the shell in the toner particle is selectively stained.

Subsequently, the image of the cross section of the obtained thin sample is captured at a magnification of 500,000 using a transmission electron microscope (TEM) (JEM2800 type: manufactured by JEOL Ltd.) under the conditions of an acceleration voltage of 200 keV and an electron beam probe size of 1 mm. Then, the shell can be confirmed by analyzing the TEM image using image analysis software. When the stained resin can be confirmed on the surface of the toner core particle, it is determined that a shell is present on the surface of the toner core particle.

Method for Confirming Presence of Fatty Acid Metal Salt on Surface of Toner Particle and Method for Identifying Fatty Acid Metal Salt The presence of the fatty acid metal salt on the surface of the toner particle can be confirmed by combining shape observation with a scanning electron microscope (SEM) and elemental analysis with an energy dispersive X-ray spectroscopy (EDS).

Using a scanning electron microscope "S-4800" (trade name; manufactured by Hitachi, Ltd.), the toner is observed in a field of view magnified 50,000 times. The external additive to be identified is observed by focusing on the toner particle surface.

EDS analysis is performed on the external additive to be distinguished, and the fatty acid metal salt is identified from the presence or absence of elemental peaks. When an elemental peak of a metal capable of constituting the fatty acid metal salt, for example, at least one metal selected from the group consisting of Mg, Zn, Ca, Al, Na, and Li is observed, the presence of the fatty acid metal salt on the surface of the toner particles can be inferred.

A specimen of the fatty acid metal salt inferred by EDS analysis is separately prepared, and shape observation by SEM and EDS analysis are performed. Comparison is performed to determine whether the analysis result of the specimen matches the analysis result of the particle to be distinguished, and where the analysis result of the specimen of the fatty acid metal salt matches the analysis result of the particle to be distinguished, it is determined that fatty acid metal salt is present on the surface of the toner particles. Also, the valence B of the metal in the fatty acid metal salt is specified from the specified type of the fatty acid metal salt.

Method for Measuring Content of Fatty Acid Metal Salt in Toner

The fatty acid metal salt is separated from the toner and the content thereof is measured by the following method.

A total of 1 g of toner is added to 31 g of chloroform in a vial and dispersed therein. For dispersion, treatment is performed for 30 min by using an ultrasonic homogenizer to prepare a dispersion. The treatment conditions are as follows.

Ultrasonic processor: Ultrasonic homogenizer VP-050 (manufactured by Taitec Corp.)

Microchip: step-type microchip, tip diameter (p 2 mm

Tip position of microchip: center of glass vial and 5 mm height from vial bottom Ultrasonic conditions: 30% intensity, 30 min. At this time, ultrasonic waves are applied while cooling the vial with ice water so that the temperature of the dispersion liquid does not rise.

The dispersion liquid is transferred in a swing rotor glass tube (50 mL), and centrifuged in a centrifuge (H-9R; manufactured by Kokusan Co., Ltd.) under the conditions of 58.33 $S^{-1}$ for 30 min. In the glass tube after centrifugation, each material constituting the toner is separated. Each material is extracted and dried under vacuum conditions (40° C./24 h). A fatty acid metal salt A satisfying the requirements of the present invention is selected, extracted, and the content thereof is measured.

Method for Measuring 50% Particle Diameter (D50) Based on Volume Distribution of Fine Particles in Fine Particle Dispersion Liquid The volume-based median diameter (D50) of resin particles such as a resin particle dispersion is measured using a laser diffraction/scattering particle diameter distribution analyzer. Specifically, the measurement is performed according to JIS Z8825-1 (2001).

A laser diffraction/scattering particle size distribution analyzer "LA-920" (manufactured by Horiba, Ltd.) is used as the measuring device. Dedicated software "HORIBA LA-920 for Windows (registered trademark) WET (LA-920) Ver. 2.02" provided with LA-920 is used to set measurement conditions and analyze measurement data. As the measurement solvent, ion-exchanged water from which solid impurities and the like have been removed in advance is used. The measurement procedure is as follows.

(1) A batch-type cell holder is attached to LA-920.

(2) A predetermined amount of ion-exchanged water is placed in a batch-type cell, and the batch-type cell is set in the batch-type cell holder.

(3) The inside of the batch-type cell is stirred using a dedicated stirrer tip.

(4) The "Refractive Index" button on the "Display Condition Setting" screen is pressed to set the relative refractive index to a value corresponding to the resin particles.

(5) On the "Display Condition Setting" screen, the particle diameter base is set to the volume base.

(6) After performing warm-up operation for 1 h or longer, optical axis adjustment, fine adjustment of the optical axis, and blank measurement are performed.

(7) 3 ml of the resin particle dispersion liquid is placed in a 100.0-ml flat-bottom glass beaker. Further, 57 ml of ion-exchanged water is added to dilute the resin particle dispersion liquid. A total of 0.3 ml of diluted solution obtained by 3-fold by mass dilution of "CONTAMINON N" (a 10% by mass aqueous solution of a neutral detergent for cleaning precision measuring instruments having pH 7 and consisting of a nonionic surfactant, an anionic surfactant, and an organic builder, manufactured by Wako Pure Chemical Industries, Ltd.) with ion-exchanged water is used as a dispersing agent.

(8) An ultrasonic disperser "Ultrasonic Dispersion System Tetora 150" (manufactured by Nikkaki Bios Co., Ltd) with an electrical output of 120 W in which two oscillators with an oscillation frequency of 50 kHz are built in with a phase shift of 180 degrees is prepared. A total of 3.3 L of deionized water is placed in the water tank of the ultrasonic disperser, and 2.0 ml of CONTAMINON N is added to this water tank.

(9) The beaker of (7) above is set in the beaker fixing hole of the ultrasonic disperser, and the ultrasonic disperser is operated. Then, the height position of the beaker is adjusted so that the resonance state of the liquid surface of the aqueous solution in the beaker is maximized.

(10) The ultrasonic dispersion treatment is continued for 60 sec. Also, in ultrasonic dispersion, the temperature of water in the water tank is adjusted, as appropriate, to from 10° C. to 40° C.

(11) The dispersion liquid of resin particles prepared in (10) above is immediately added little by little to the batch cell while taking care not to introduce air bubbles, and the transmittance of the tungsten lamp is adjusted to from 90% to 95%. Then, the particle size distribution of the resin particles is measured. D50 is calculated based on the obtained volume-based particle size distribution data.

EXAMPLES

The present disclosure will be described in more detail below with examples and comparative examples, but the present disclosure is not limited thereto. Parts used in the examples are by mass unless otherwise specified.

Fatty Acid Metal Salt

Fatty acid metal salts 1 to 3 listed in Table 1 were used as the fatty acid metal salt.

TABLE 1

| | Fatty acid metal salt type | Valence | Particle diameter (μm) |
|---|---|---|---|
| Fatty acid metal salt 1 | Zinc stearate | 2 | 0.5 |
| Fatty acid metal salt 2 | Aluminum stearate | 3 | 1.3 |
| Fatty acid metal salt 3 | Barium stearate | 2 | 0.7 |

In Table 1, the valence indicates the metal valence of the fatty acid metal salt. The particle diameter indicates a 50% particle diameter based on volume distribution.

Production Example of Toner Particle 1

Synthesis of Polyester Resin 1

Bisphenol A ethylene oxide 2 mol adduct: 9 mol parts

Bisphenol A propylene oxide 2 mol adduct: 90 mol parts

Terephthalic acid: 50 mol parts

Fumaric acid: 30 mol parts

Dodecenyl succinic acid: 25 mol parts

The above monomers were put in a flask equipped with a stirrer, a nitrogen introduction tube, a temperature sensor, and a rectification column, the temperature was raised to 195° C. over 1 h, and it was confirmed that the inside of the reaction system was uniformly stirred. A total of 1.0 part of tin distearate was added to 100 parts of these monomers. Further, the temperature was raised from 195° C. to 250° C. over 5 h while distilling off the generated water, and a dehydration condensation reaction was carried out at 250° C. for another 2 h.

As a result, a polyester resin 1 having a glass transition temperature of 59.8° C., an acid value of 16.3 mg KOH/g, a hydroxyl value of 27.3 mg KOH/g, a weight average molecular weight of 10,900, and a number average molecular weight of 4000 was obtained.

Synthesis of Polyester Resin 2

Bisphenol A ethylene oxide 2 mol adduct: 45 mol parts

Bisphenol A propylene oxide 2 mol adduct: 45 mol parts

Terephthalic acid: 65 mol parts

Dodecenyl succinic acid: 30 mol parts

The above monomers were put into a flask equipped with a stirrer, a nitrogen introduction tube, a temperature sensor, and a rectification column, the temperature was raised to 195° C. over 1 h, and it was confirmed that the inside of the reaction system was uniformly stirred. A total of 0.7 part of tin distearate was added to 100 parts of these monomers. Further, the temperature was raised from 195° C. to 240° C. over 5 h while distilling off the generated water, and a dehydration condensation reaction was carried out at 240° C. for another 2 h. Then, the temperature was lowered to 190° C., 5 mol parts of trimellitic anhydride was gradually added, and the reaction was continued at 190° C. for 1 h.

As a result, a polyester resin 2 having a glass transition temperature of 55.2° C., an acid value of 14.3 mg KOH/g, a hydroxyl value of 24.1 mg KOH/g, a weight average molecular weight of 43,600, and a number average molecular weight of 6200 was obtained.

Preparation of Resin Particle-Dispersed Solution 1

Polyester resin 1: 100 parts

Methyl ethyl ketone: 50 parts

Isopropyl alcohol 20: parts

The methyl ethyl ketone and isopropyl alcohol were put into a container. Then, the above resin was gradually added, stirred, and completely dissolved to obtain a polyester resin 1 solution. The container containing the polyester resin 1 solution was set at 65° C., a 10% aqueous ammonia solution was gradually added dropwise to a total of 5 parts while stirring, and 230 parts of ion-exchanged water was gradually added dropwise at a rate of 10 ml/min to induce phase inversion emulsification. Further, the solvent was removed by reducing the pressure with an evaporator to obtain a resin particle-dispersed solution 1 of the polyester resin 1. The volume average particle diameter of the resin particles was 135 nm. The resin particle solid fraction amount was adjusted to 20 mass % with ion-exchanged water.

Preparation of Resin Particle-Dispersed Solution 2

Polyester resin 2: 100 parts

Methyl ethyl ketone: 50 parts

Isopropyl alcohol: 20 parts

The methyl ethyl ketone and isopropyl alcohol were put into a container. Then, above materials were gradually added, stirred, and completely dissolved to obtain a polyester resin 2 solution. The container containing the polyester resin 2 solution was set at 40° C., a 10% aqueous ammonia solution was gradually added dropwise to a total of 3.5 parts while stirring, and 230 parts of ion-exchanged water was gradually added dropwise at a rate of 10 ml/min to induce phase inversion emulsification. Further, the solvent was removed by reducing the pressure to obtain a resin particle-dispersed solution 2 of the polyester resin 2. The volume average particle diameter of the resin particles was 155 nm. The resin particle solid fraction amount was adjusted to 20 mass % with ion-exchanged water.

Preparation of Colorant Particle-Dispersed Solution

Copper phthalocyanine (Pigment Blue 15:3): 45 parts

Ionic surfactant Neogen RK (manufactured by DKS Co., Ltd.): 5 parts

Ion-exchanged water: 190 parts

The above components were mixed and dispersed for 10 min with a homogenizer (ULTRA-TURRAX manufactured by IKA), and then dispersed for 20 min at a pressure of 250 MPa using an ULTIMIZER (counter-collision wet pulverizer: manufactured by Sugino Machine Limited) to obtain a colorant particle-dispersed solution having a volume average particle diameter of 120 nm and a solid fraction amount of 20 mass %.

Preparation of Release Agent Particle-Dispersed Solution

Release agent (hydrocarbon wax, melting point: 79° C.): 15 parts

Ionic surfactant Neogen RK (manufactured by DKS Co., Ltd.): 2 parts

Ion-exchanged water: 240 parts

The above components were heated to 100° C., sufficiently dispersed with ULTRA-TURRAX T50 manufactured by IKA, then heated to 115° C. with a pressure discharge type Gaulin homogenizer and subjected to dispersion treatment for 1 h to obtain a release agent particle-dispersed solution having a volume average particle diameter of 160 nm and a solid fraction amount of 20 mass %.

Production of Toner Particles 1

Resin particle-dispersed solution 1: 500 parts

Resin particle-dispersed solution 2: 400 parts

Colorant particle-dispersed solution: 50 parts

Release agent particle-dispersed solution: 80 parts

First, as a core forming step, the above materials were put into a round stainless steel flask and mixed. Subsequently, a homogenizer ULTRA-TURRAX T50 (manufactured by IKA) was used to disperse at 5000 r/min for 10 min. After adding a 1.0% aqueous nitric acid solution and adjusting the pH to 3.0, heating was performed to 58° C. while using a stirring blade in a water bath for heating and adjusting, as appropriate, the number of revolutions. The volume-average particle diameter of the formed aggregated particles was appropriately confirmed, and when aggregated particles (cores) of 4.0 μm were formed, the following materials were added as a shell pre-formation step.

Ion-exchanged water: 300 parts 10.0% by mass borax aqueous solution: 19 parts (Borax: sodium tetraborate decahydrate manufactured by Wako Pure Chemical Industries, Ltd.)

Furthermore, as a shell formation step, the following material was added and stirred for 1 h to form a shell.

Resin particle dispersion liquid 1 40 parts

After that, the pH was adjusted to 9.0 using a 5% sodium hydroxide aqueous solution, and the mixture was heated to 89° C. while continuing stirring.

When the desired surface shape was obtained, the heating was stopped, the material was cooled to 25° C., filtered and solid-liquid separated, and then washed with ion-exchanged water. After washing, toner particles 1 having a weight-average particle diameter (D4) of 7.1 μm were obtained by drying using a vacuum dryer. Table 4 shows the physical properties of the toner particles 1 thus obtained.

Production Examples of Toner Particles 2 to 12

Toner particles 2 to 12 were obtained in the same manner as toner particles 1, except that the formulation and conditions were changed to those shown in Table 2.

TABLE 2

| | Core formation step | | | Release | Shell formation step | | |
|---|---|---|---|---|---|---|---|
| Toner particles No. | Resin particle dispersion liquid 1 (parts) | Resin particle dispersion liquid 2 (parts) | Colorant particle dispersion liquid (parts) | agent particle dispersion liquid (parts) | Resin particle dispersion liquid 1 (parts) | Ion-exchanged water (parts) | 10.0% by mass borax aqueous solution (parts) |
| 1 | 500 | 400 | 50 | 80 | 40 | 300 | 19 |
| 2 | 500 | 400 | 50 | 80 | 40 | 300 | 3 |
| 3 | 500 | 400 | 50 | 80 | 10 | 300 | 19 |
| 4 | 500 | 400 | 50 | 80 | 8 | 300 | 19 |
| 5 | 500 | 400 | 50 | 80 | 40 | 300 | 58 |
| 6 | 500 | 400 | 50 | 80 | 40 | 300 | 2 |
| 7 | 500 | 400 | 50 | 80 | 40 | 300 | 61 |
| 8 | 500 | 400 | 50 | 80 | 8 | 300 | 2 |
| 9 | 500 | 400 | 50 | 80 | 8 | 300 | 61 |
| 10 | 500 | 400 | 50 | 80 | 0 | 300 | 61 |
| 11 | 500 | 400 | 50 | 80 | 0 | 300 | 19 |
| 12 | 500 | 400 | 50 | 80 | 40 | 300 | 0 |

Example 1

To 100.0 parts of the toner particles 1 obtained above, 1.3 parts of hydrophobic silica (RY50, manufactured by Nippon Aerosil Co., Ltd.) and 0.2 parts of the fatty acid metal salt 1 were added, and dry mixing was performed for 5 min in a Henschel mixer (manufactured by Mitsui Mining Co., Ltd.) at a peripheral speed of 38 m/sec to obtain a toner 1. Table 4 shows the physical properties of the toner 1 obtained. Using the toner 1, the following actual machine evaluation was performed. Table 5 shows the evaluation results.

Toner Evaluation

<1> Evaluation of Low-Temperature Fixability

A process cartridge filled with the toner was allowed to stand for 48 h in a normal temperature and normal humidity (N/N) environment (23° C., 60% RH). Using LBP7600C (manufactured by Canon Inc.) modified to operate even if the fixing device is removed to the outside, an unfixed image having an image pattern in which 10 mm×10 mm square images are evenly arranged at 9 points on the entire transfer paper was output. The toner laid-on level on the transfer paper was set to 1.0 mg/cm$^2$, and the fixing onset temperature was evaluated. Fox River Bond (90 g/m$^2$) was used as the transfer paper.

As the fixing device, an external fixing device obtained by removing the LBP7600C fixing device to the outside and configuring it to be operable even outside the laser beam printer was used. The fixing temperature of the external fixing device was increased from 120° C. by 10° C., and the process speed was 210 mm/sec during fixing.

The image density was measured using an X-Rite color reflection densitometer (500 series: manufactured by X-Rite Inc.). First, the image density at the central portion of the fixed image was measured. Next, in the portion where the image density was measured, the fixed image was rubbed 5 times with Silbon paper [Lenz Cleaning Paper "dasper (R)" (Ozu Paper Co. Ltd)] with a load of 50 g/cm$^2$, and the image density was measured again. Then, the temperature at which the rate of density decreases before and after rubbing became 10% or less was defined as the fixing onset temperature, and the low-temperature fixability was evaluated according to the following criteria. Table 5 shows the evaluation results.

Evaluation Criteria

A: Fixing onset temperature is 120° C. or more and less than 130° C.

B: Fixing onset temperature is 130° C. or more and less than 140° C.

C: Fixing onset temperature is 140° C. or more and less than 150° C.

D: Fixing onset temperature is 150° C. or higher

<2> Fogging Evaluation

Durability was evaluated using a commercially available Canon printer LBP9200C. The LBP9200C employs one-component contact development, and the amount of toner on the developer carrying member is controlled with a toner regulating member. The commercially available cartridge from which the toner was removed and which was then cleaned by an air blow and filled with 150 g of the toner to be evaluated was used as the evaluation cartridge. Evaluation was carried out by installing the cartridge in the cyan station and installing dummy cartridges in the other stations.

The evaluation was conducted in a high-temperature and high-humidity environment (temperature 32° C./humidity 85% RH). Using CS-680 of A4 size (basis weight 68 g/cm$^2$) as a transfer material, 5 blank images were printed, and the fogging rate was measured for each to obtain the maximum value, which was taken as the fogging rate. The fogging rate was measured as follows.

Using a digital white photometer (Type TC-6D manufactured by Tokyo Denshoku Co., Ltd., uses a green filter), the reflectance (%) of the evaluation image and the white background before paper passing was measured at 5 points per sheet, and an average reflectance (%) was obtained. The difference between the average reflectance (%) of the white paper before paper passing and the average reflectance (%) of the evaluation image was taken as the fogging rate (%). In the present disclosure, a rating of C or higher was determined to be acceptable. Table 5 shows the evaluation results.

Evaluation Criteria

A: Fogging rate is less than 0.5%

B: Fogging rate is 0.5% or more and less than 1.0%

C: Fogging rate is 1.0% or more and less than 1.5%

D: Fogging rate is 1.5% or more

Developing Performance in Durability Test

The image density was measured by measuring the relative density with respect to an image with a white background with an image density of 0.00 by using "Macbeth Densitometer RD918" (manufactured by Macbeth Co., Ltd.) according to the instruction manual provided with the device, and the obtained relative density was used as the value of image density. The developing performance in a durability test was determined by a density decrease degree.

All-solid images were output on three sheets under the same conditions as in fogging evaluation, and the density average value at the center of each image was used as the initial density. After that, the 1% printed image was continuously output on 10,000 sheets, and then the all-solid image was output again on 3 sheets. Taking the average value of the density at the center of each of the three printed images as the durability density, the value of the density difference (initial density−durability density) before and after the durability test was evaluated based on the following criteria. In the present disclosure, a rating of C or higher was determined to be acceptable. Table 5 shows the evaluation results.

Evaluation Criteria

A: Density difference less than 0.10

B: Density difference is 0.10 or more and less than 0.15

C: Density difference of 0.15 or more and less than 0.20

D: Density difference of 0.20 or more

<4> Evaluation of Cleaning Performance

After evaluating the durability development performance, 5 sheets of halftone images with a toner laid-on level of 0.2 mg/cm$^2$ were printed under the same conditions, and the presence or absence of images with cleaning defects and the presence or absence of contamination on the charging roller were visually evaluated according to the following criteria. In the present disclosure, a rating of C or higher was determined to be acceptable. Table 5 shows the evaluation results.

Evaluation Criteria

A: No images with cleaning defects, charging roller is not contaminated

B: No images with cleaning defects, charging roller is contaminated

C: Some cleaning defects can be confirmed, charging roller is contaminated

D: Cleaning defects are conspicuous, charging roller is contaminated

<5> Evaluation of Heat-Resistant Storage Stability

A total of 5.0 g of toner was placed in a 100 ml resin cup and allowed to stand for 10 days at a temperature of 50° C. and a humidity of 10% RH, and then the degree of agglomeration of the toner was measured as follows.

A measuring device was prepared by connecting a digital display type vibration meter "DIGI-VIBRO MODEL 1332A" (manufactured by Showa Sokki Corporation) to the side surface portion of the vibration table of the "POWDER TESTER" (manufactured by Hosokawa Micron Corporation). A sieve with an opening of 38 μm (400 mesh), a sieve with an opening of 75 μm (200 mesh), and a sieve with an opening of 150 μm (100 μmesh) were stacked and set in this order from the bottom on the vibration table of the powder tester. The measurement was performed as follows under the environment of 23° C. and 60% RH.

(1) The amplitude of vibration of the vibration table was adjusted in advance so that the displacement value of the digital display type vibration meter was 0.60 mm (peak-to-peak).

(2) A total of 5 g of the toner that was allowed to stand under above conditions was accurately weighed and gently placed on the uppermost sieve with an opening of 150 μm.

(3) After vibrating the sieve for 15 sec, the mass of the toner remaining on each sieve was measured, and the degree of agglomeration was calculated based on the following formula.

$$\text{Degree of agglomeration (\%)} = \{(\text{Sample mass (g) on the sieve with an opening of 150 μm})/5(\text{g})\}\times 100+\{(\text{Sample mass on the sieve with an opening of 75 μm (g)})/5(\text{g})\}\times 100\times 0.6+\{(\text{Sample mass (g) on the sieve with an opening of 38 μm})/5(\text{g})\}\times 100\times 0.2$$

The calculated degree of agglomeration was evaluated based on the following evaluation criteria and used as an evaluation of heat-resistant storage stability.

Evaluation Criteria

A: Degree of agglomeration is less than 20%

B: Degree of agglomeration is 20% or more and less than 25%

C: Degree of agglomeration is 25% or more and less than 30%

D: Degree of agglomeration is 30% or more

Examples 2 to 22 and Comparative Examples 1 to 5

The type of toner particles used, the type and amount of the fatty acid metal salt, and the external addition conditions of the fatty acid metal salt were changed as shown in Table 3, toners 2 to 27 were produced, and the same evaluations as in Example 1 were performed.

Table 4 shows the physical properties of toners 2 to 27. Table 5 shows the evaluation results of Examples 2 to 22 and Comparative Examples 1 to 5.

TABLE 3

| Toner | | Hydrophobic silica | Fatty acid metal salt | | External addition and mixing time |
|---|---|---|---|---|---|
| No. | Toner particles | (parts) | Type | Parts | (min) |
| 1 | Toner particles 1 | 1.3 | Fatty acid metal salt 1 | 0.2 | 5 |
| 2 | Toner particles 1 | 1.3 | Fatty acid metal salt 2 | 0.3 | 5 |
| 3 | Toner particles 1 | 1.3 | Fatty acid metal salt 3 | 0.3 | 5 |

TABLE 3-continued

| Toner No. | Toner particles | Hydrophobic silica (parts) | Fatty acid metal salt Type | Fatty acid metal salt Parts | External addition and mixing time (min) |
|---|---|---|---|---|---|
| 4 | Toner particles 1 | 1.3 | Fatty acid metal salt 1 | 0.3 | 3 |
| 5 | Toner particles 1 | 1.3 | Fatty acid metal salt 1 | 0.2 | 8 |
| 6 | Toner particles 1 | 1.3 | Fatty acid metal salt 1 | 0.3 | 3 |
| 7 | Toner particles 1 | 1.3 | Fatty acid metal salt 1 | 0.2 | 9 |
| 8 | Toner particles 2 | 1.3 | Fatty acid metal salt 1 | 0.05 | 5 |
| 9 | Toner particles 1 | 1.3 | Fatty acid metal salt 1 | 0.5 | 5 |
| 10 | Toner particles 2 | 1.3 | Fatty acid metal salt 1 | 0.04 | 2 |
| 11 | Toner particles 1 | 1.3 | Fatty acid metal salt 1 | 0.6 | 6 |
| 12 | Toner particles 3 | 1.3 | Fatty acid metal salt 1 | 0.2 | 5 |
| 13 | Toner particles 4 | 1.3 | Fatty acid metal salt 1 | 0.2 | 5 |
| 14 | Toner particles 2 | 1.3 | Fatty acid metal salt 1 | 0.2 | 5 |
| 15 | Toner particles 5 | 1.3 | Fatty acid metal salt 1 | 0.45 | 6 |
| 16 | Toner particles 6 | 1.3 | Fatty acid metal salt 1 | 0.2 | 5 |
| 17 | Toner particles 7 | 1.3 | Fatty acid metal salt 1 | 0.5 | 6 |
| 18 | Toner particles 8 | 1.3 | Fatty acid metal salt 1 | 0.04 | 2 |
| 19 | Toner particles 9 | 1.3 | Fatty acid metal salt 1 | 0.6 | 8 |
| 20 | Toner particles 9 | 1.3 | Fatty acid metal salt 1 | 0.6 | 5 |
| 21 | Toner particles 9 | 1.3 | Fatty acid metal salt 2 | 0.2 | 3 |
| 22 | Toner particles 8 | 1.3 | Fatty acid metal salt 2 | 0.03 | 5 |
| 23 | Toner particles 1 | 1.3 | — | 0 | 5 |
| 24 | Toner particles 10 | 1.3 | Fatty acid metal salt 2 | 0.6 | 5 |
| 25 | Toner particles 9 | 1.3 | — | 0 | 5 |
| 26 | Toner particles 11 | 1.3 | Fatty acid metal salt 1 | 0.2 | 5 |
| 27 | Toner particles 12 | 1.3 | Fatty acid metal salt 1 | 0.2 | 5 |

TABLE 4

| Toner No. | Peak of boric acid | Presence ratio of boron element (atomic %) | Content of boron element (ppm) | As (%) | Fatty acid metal salt on toner particle surface | Content of fatty acid metal salt (parts) | Migration amount (parts) | A × B | C/10 |
|---|---|---|---|---|---|---|---|---|---|
| 1 | Presence | 0 | 650 | 0.1 | Presence | 0.20 | 0.10 | 8.81 | 6.35 |
| 2 | Presence | 0 | 650 | 0.1 | Presence | 0.30 | 0.12 | 6.99 | 6.35 |
| 3 | Presence | 0 | 650 | 0.1 | Presence | 0.30 | 0.12 | 8.53 | 6.35 |
| 4 | Presence | 0 | 650 | 0.1 | Presence | 0.30 | 0.20 | 13.22 | 6.35 |
| 5 | Presence | 0 | 650 | 0.1 | Presence | 0.20 | 0.04 | 8.81 | 6.35 |
| 6 | Presence | 0 | 650 | 0.1 | Presence | 0.30 | 0.21 | 13.22 | 6.35 |
| 7 | Presence | 0 | 650 | 0.1 | Presence | 0.20 | 0.03 | 8.81 | 6.35 |
| 8 | Presence | 0 | 100 | 0.1 | Presence | 0.05 | 0.04 | 2.20 | 0.98 |
| 9 | Presence | 0 | 650 | 0.1 | Presence | 0.50 | 0.20 | 22.03 | 6.35 |
| 10 | Presence | 0 | 100 | 0.1 | Presence | 0.04 | 0.02 | 1.76 | 0.98 |
| 11 | Presence | 0 | 650 | 0.1 | Presence | 0.60 | 0.20 | 26.43 | 6.35 |
| 12 | Presence | 0 | 650 | 4.6 | Presence | 0.20 | 0.10 | 8.81 | 6.35 |
| 13 | Presence | 0 | 650 | 5.1 | Presence | 0.20 | 0.10 | 8.81 | 6.35 |
| 14 | Presence | 0 | 100 | 0.1 | Presence | 0.20 | 0.11 | 8.81 | 0.98 |
| 15 | Presence | 0 | 2000 | 0.1 | Presence | 0.45 | 0.15 | 19.82 | 19.52 |
| 16 | Presence | 0 | 80 | 0.1 | Presence | 0.20 | 0.11 | 8.81 | 0.78 |
| 17 | Presence | 0 | 2100 | 0.1 | Presence | 0.50 | 0.15 | 22.03 | 20.50 |
| 18 | Presence | 0 | 80 | 5.1 | Presence | 0.04 | 0.02 | 1.76 | 0.78 |
| 19 | Presence | 0 | 2100 | 5.1 | Presence | 0.60 | 0.15 | 26.43 | 20.50 |
| 20 | Presence | 0 | 2100 | 5.1 | Presence | 0.60 | 0.25 | 26.43 | 20.50 |
| 21 | Presence | 0 | 2100 | 5.1 | Presence | 0.20 | 0.25 | 13.99 | 20.50 |
| 22 | Presence | 0 | 80 | 5.1 | Presence | 0.03 | 0.02 | 0.70 | 0.78 |
| 23 | Presence | 0 | 650 | 0.1 | Absence | 0.00 | 0.00 | 0.00 | 0.00 |
| 24 | Presence | 8.1 | 2100 | 20 | Presence | 0.60 | 0.25 | 0.93 | 20.50 |
| 25 | Presence | 0 | 2100 | 5.1 | Absence | 0.00 | 0.00 | 0.00 | 20.50 |
| 26 | Presence | 1.5 | 650 | 20 | Presence | 0.20 | 0.10 | 8.81 | 20.50 |
| 27 | Absence | 0 | 0 | 0.1 | Presence | 0.20 | 0.10 | 8.81 | 0.00 |

The items in Table 4 represent the following.

“Peak of boric acid” indicates the presence or absence of a peak corresponding to boric acid when ATR-TR analysis is performed using germanium as the ATR crystal in the ATR method.

“Presence ratio of boron element” indicates the presence ratio (atomic %) of boron element on the surface of the toner particle as measured by X-ray photoelectron spectroscopy.

“Fatty acid metal salt on toner particle surface” indicates the presence or absence of a fatty acid metal salt on the surface of the toner particle.

“Migration amount” indicates the amount of fatty acid metal salt that migrated from the toner to the dispersion liquid when the toner was subjected to dispersion treatment in dispersion liquid obtained by adding sucrose and a surfactant to deionized water.

TABLE 5

| | Toner No. | Low-temperature fixability | Fogging | Durability developing performance | Cleaning performance | Heat-resistance storage stability |
|---|---|---|---|---|---|---|
| Example 1 | 1 | A (123) | A (0.1) | A (0.05) | A | A (6) |
| Example 2 | 2 | A (126) | A (0.3) | A (0.08) | B | A (9) |
| Example 3 | 3 | A (126) | A (0.3) | A (0.08) | B | A (8) |
| Example 4 | 4 | A (124) | B (0.6) | A (0.06) | A | A (7) |
| Example 5 | 5 | A (125) | A (0.4) | A (0.05) | B | A (9) |
| Example 6 | 6 | A (125) | C (1.1) | A (0.07) | A | A (12) |
| Example 7 | 7 | A (125) | A (0.3) | A (0.08) | C | A (11) |
| Example 8 | 8 | B (133) | A (0.3) | B (0.12) | B | B (21) |
| Example 9 | 9 | A (126) | B (0.9) | A (0.07) | A | A (10) |
| Example 10 | 10 | B (135) | A (0.4) | B (0.14) | C | B (22) |
| Example 11 | 11 | A (125) | C (1.2) | A (0.07) | A | A (13) |
| Example 12 | 12 | A (123) | B (0.8) | B (0.13) | A | B (21) |
| Example 13 | 13 | A (124) | C (1.1) | C (0.15) | A | B (24) |
| Example 14 | 14 | B (138) | A (0.3) | B (0.12) | A | B (23) |
| Example 15 | 15 | A (123) | C (1.0) | A (0.09) | A | A (5) |
| Example 16 | 16 | C (143) | A (0.3) | B (0.14) | A | C (27) |
| Example 17 | 17 | A (120) | C (1.2) | A (0.08) | A | A (6) |
| Example 18 | 18 | C (145) | C (1.2) | C (0.15) | C | C (28) |
| Example 19 | 19 | A (122) | C (1.2) | B (0.11) | A | C (28) |
| Example 20 | 20 | A (123) | C (1.4) | B (0.12) | A | C (29) |
| Example 21 | 21 | A (122) | C (1.4) | C (0.16) | A | C (27) |
| Example 22 | 22 | C (146) | C (1.4) | C (0.18) | C | C (28) |
| Comparative Example 1 | 23 | A (123) | D (1.8) | D (0.21) | D | A (15) |
| Comparative Example 2 | 24 | B (133) | D (1.6) | D (0.23) | B | C (28) |
| Comparative Example 3 | 25 | B (135) | D (2.1) | D (0.21) | D | B (23) |
| Comparative Example 4 | 26 | A (123) | C (1.3) | D (0.22) | A | C (28) |
| Comparative Example 5 | 27 | D (154) | C (1.3) | D (0.24) | A | D (33) |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2022-122544, filed Aug. 1, 2022, which is hereby incorporated by reference herein in its entirety.

What is claimed is:

1. A toner, comprising:

a toner particle comprising a binder resin and a boric acid;

a surface of the toner comprising a fatty acid metal salt, wherein a peak corresponding to the boric acid is detected when the toner particle is subjected to ATR-IR analysis using germanium as an ATR crystal, a presence ratio of a boron element on the surface of the toner particle is 0.01 atomic % or less measured by X-ray photoelectron spectroscopy, and C/10<A×B when A (mol/μg) is a content of a metal element in the toner, B is a valence of a metal of the fatty acid metal salt, and C (mol/μg) is a content of boron in the toner.

2. The toner according to claim 1, wherein the binder resin comprises a resin capable of forming hydrogen bonds with the boric acid.

3. The toner according to claim 1, wherein a content of the boron element on a mass basis in the toner is 80 to 2000 ppm.

4. The toner according to claim 1, wherein in cross-sectional observation of the toner with a transmission electron microscope, As is 5.0% or less when As is an area ratio occupied by a release agent in a surface layer region from the surface of the toner particle to a depth of 1.0 μm.

5. The toner according to claim 1, wherein a content of the fatty acid metal salt in the toner is 0.05 to 0.50 parts by mass with respect to 100 parts by mass of the toner particle.

6. The toner according to claim 1, wherein when the toner is subjected to a dispersion treatment in a dispersion liquid comprising a sucrose and a surfactant in ion-exchanged water, an amount of the fatty acid metal salt migrated from the toner to the dispersion liquid is 0.04 to 0.20 parts by mass with respect to 100 parts by mass of the toner particle.

7. The toner according to claim 2, wherein the resin capable of forming hydrogen bonds with the boric acid comprises a polyester resin.

8. The toner according to claim 2, wherein the toner particle comprises a toner core particle and a shell on a surface of the toner core particle, and the toner core particle comprises the boric acid and the resin capable of forming hydrogen bonds with the boric acid.

9. The toner according to claim 8, wherein the shell comprises the resin capable of forming hydrogen bonds with the boric acid.

10. The toner according to claim 1, wherein the fatty acid metal salt is a salt of a fatty acid having 16 to 20 carbon atoms and a polyvalent metal having a valence of 2 or more.

11. The toner according to claim 10, wherein the fatty acid metal salt is at least one member selected from the group consisting of zinc stearate, aluminum stearate and barium stearate.

* * * * *